United States Patent
Parvulescu et al.

(10) Patent No.: US 10,300,468 B2
(45) Date of Patent: May 28, 2019

(54) PROCESS FOR THE PREPARATION OF AN MWW ZEOLITIC MATERIAL COMPRISING BORON AND TITANIUM

(71) Applicant: BASF SE, Ludwigshafen (DE)

(72) Inventors: Andrei-Nicolae Parvulescu, Ruppertsberg (DE); Ulrich Mueller, Neustadt (DE); Georg Uhl, Kaiserslautern (DE); Joaquim Henrique Teles, Waldsee (DE); Dominic Riedel, Lampertheim (DE)

(73) Assignee: BASF SE, Ludwigshafen (DE)

( * ) Notice: Subject to any disclaimer, the term of this patent is extended or adjusted under 35 U.S.C. 154(b) by 145 days.

(21) Appl. No.: 15/509,527

(22) PCT Filed: Sep. 8, 2015

(86) PCT No.: PCT/EP2015/070488
§ 371 (c)(1),
(2) Date: Mar. 8, 2017

(87) PCT Pub. No.: WO2016/038030
PCT Pub. Date: Mar. 17, 2016

(65) Prior Publication Data
US 2017/0246620 A1 Aug. 31, 2017

(30) Foreign Application Priority Data
Sep. 9, 2014 (EP) .................................... 14184111

(51) Int. Cl.
*B01J 29/89* (2006.01)
*C01B 39/08* (2006.01)
*C01B 39/12* (2006.01)
*C01B 39/48* (2006.01)
*B01J 37/00* (2006.01)
*B01J 37/04* (2006.01)
*B01J 37/06* (2006.01)
*B01J 37/08* (2006.01)
*B01J 37/10* (2006.01)
*C01B 39/00* (2006.01)
*B01J 29/70* (2006.01)
*B01J 20/18* (2006.01)

(52) U.S. Cl.
CPC ........... *B01J 29/89* (2013.01); *B01J 37/0009* (2013.01); *B01J 37/009* (2013.01); *B01J 37/0018* (2013.01); *B01J 37/04* (2013.01); *B01J 37/06* (2013.01); *B01J 37/086* (2013.01); *B01J 37/10* (2013.01); *C01B 39/00* (2013.01); *C01B 39/085* (2013.01); *C01B 39/12* (2013.01); *C01B 39/48* (2013.01); *B01J 20/18* (2013.01); *B01J 29/7038* (2013.01); *C01P 2002/72* (2013.01); *C01P 2002/82* (2013.01); *C01P 2002/86* (2013.01)

(58) Field of Classification Search
CPC ........ B01J 29/7038; B01J 29/89; B01J 20/18; C01B 39/085; C01B 39/12; C01P 2002/86
See application file for complete search history.

(56) References Cited

U.S. PATENT DOCUMENTS

2011/0190517 A1 8/2011 Mandimutsira et al.
2011/0237810 A1 9/2011 Kawabata et al.

FOREIGN PATENT DOCUMENTS

WO 2010/067855 A1 6/2010
WO 2012/046881 A1 4/2012

OTHER PUBLICATIONS

Sulaymon et al, "Spherical Zeolite-Binder Agglomerates", Trans IChemE vol. 77, part A, (Jun. 1999), pp. 342-350 (Year: 1999).*
International Search Report and Written Opinion dated Nov. 26, 2015 in PCT/EP2015/070488 filed Sep. 8, 2015.
Peng Wu et al., "A Novel Titanosilicate with MWW Structure. I. Hydrothermal Synthesis, Elimination of Extraframework Titanium, and Characterizations", Journal of Physical Chemistry B, vol. 105, No. 15, Apr. 15, 2001, pp. 2897-2905, XP-002204295.
Peng Wu et al., "A Novel Titanosilicate with MWW Structure: II. Catalytic Properties in the Selective Oxidation of Alkenes", Journal of Catalysis, vol. 202, No. 2, Published online Aug. 9, 2001, pp. 245-255, XP004432448.

* cited by examiner

*Primary Examiner* — David M Brunsman
(74) *Attorney, Agent, or Firm* — Oblon, McClelland, Maier & Neustadt, L.L.P.

(57) ABSTRACT

A process for the preparation of a zeolitic material having an MWW framework structure and comprising boron and titanium, the process comprising (i) providing an aqueous synthesis mixture comprising a silica source, a boron source, a titanium source, and an MWW templating agent; (ii) heating the aqueous synthesis mixture to a temperature in the range of from 160 to 190 ° C.; (iii) subjecting the synthesis mixture (ii) to hydrothermal synthesis conditions, obtaining, in its mother liquor, a precursor of the zeolitic material; (iv) separating the precursor from its mother liquor; (v) calcining the separated precursor, obtaining the zeolitic material having an MWW framework structure and comprising boron and titanium.

24 Claims, 10 Drawing Sheets

Figure 1:
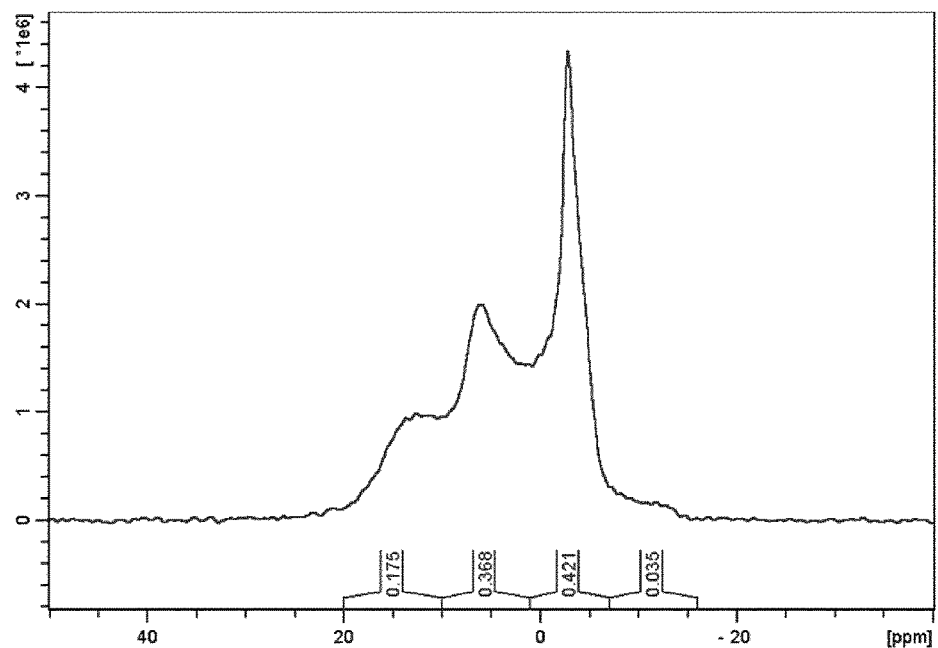

PROCESS FOR THE PREPARATION OF AN MWW ZEOLITIC MATERIAL COMPRISING BORON AND TITANIUM

This application is a 371 filing of PCT/EP2015/070488, filed Sep. 8, 2015 which is based on EPO 14184111.4 filed Sep. 9, 2014.

The present invention relates to a novel process for the preparation of a zeolitic material having an MWW framework structure and comprising boron and titanium. Further, the present invention relates to a novel zeolitic material having an MWW framework structure and comprising boron and titanium. Still further, the present invention relates to preferred uses of this novel zeolitic material.

In state of the art processes for preparing conventional Ti-MWW zeolitic materials, a precursor of this material is prepared based which, in addition to silicon and titanium comprised in the MWW framework, contains boron. For the preparation of the final Ti-MWW in its calcined state, the boron is substantially removed by an acid treatment before the precursor is calcined.

For example, P. Wu et al., "A novel titanosilicate with MWW structure. I. Hydrothermal synthesis, elimination of extra-framework titanium, and characterizations", J. Phys. Chem. B., 2001, vol. 105, no. 15, p. 2897 to 2905 discloses a process for preparing a Ti-MWW zeolitic material wherein such a precursor comprising boron and titanium is prepared by hydrothermal synthesis wherein an aqueous synthesis mixture of piperidine, silica, boric acid and tetrabutyl orthotitanate is heated in an autoclave in a first step for 24 h at 130° C., then in a second step for 24 h at 150° C., and in yet a further, third step for 120 h at 170° C. A disadvantage of this stepwise heating is that it requires an elaborate temperature control for setting different temperatures for pre-determined time ranges. Prior to calcination, the precursor is subjected to an acid treatment with an aqueous solution of nitric or sulfuric acid in order to remove boron from the precursor. After calcination, the calcined zeolitic material is subjected to an acid treatment with an aqueous solution of nitric or sulfuric acid.

US 20110190517 A1 discloses a process for preparing a Ti-MWW zeolitic material wherein a zeolitic material having an MWW framework structure and comprising titanium is prepared by a hydrothermal synthesis in which an aqueous synthesis mixture of piperidine, silica, boric acid and tetra-butyl orthotitanate is heated in an autoclave in a first step for 24 h at 130° C., then in a second step for 24 h at 150° C., and in yet a further, third step for 120 h at 170° C. Thus, US 2011/0190517 A1 discloses the same disadvantageous temperature control mechanism as P. Wu et al. Prior to calcination, the precursor is subjected to an acid treatment with a 2 M aqueous solution of nitric acid in order to remove boron from the precursor.

WO 2012/046881 A1 discloses a process for preparing Ti-MWW zeolitic material wherein a precursor material comprising boron and titanium is prepared by a hydrothermal synthesis wherein an aqueous synthesis mixture containing piperidine, silica, boric acid and tetrabutyl orthotitanate is suitably heated. WO 2012/046881 A1 teaches that very high amounts of tetrabutyl orthotitanate have to be employed. Prior to calcination, the precursor is subjected to an acid treatment with a 2M aqueous solution of nitric acid in order to remove boron.

WO 2010/067855 A1 discloses a method for producing a Ti-MWW material. Therein, Comparative Example 1 relates to a process for preparing a Ti-MWW zeolite comprising Ti and no B in the framework. Under hydrothermal conditions, piperidine, tetra-n-butylorthotitanate, boric acid and fumed silica are converted into a solid MWW precursor compound which does not yet exhibit the MWW framework structure. Prior to calcination—during which the MWW framework material is formed—, the MWW precursor compound is treated with 2M nitric acid to remove boron.

Thus, it is an object of the present invention to provide a simple process for the preparation of a zeolitic material having an MWW framework structure, wherein the zeolitic material, in addition to titanium, further contains an additional element as framework element.

According to the present invention, it was found that this object can be solved if, on the one hand, a straight-forward temperature regime during the hydrothermal synthesis is applied and, on the other hand, a precursor comprising boron is not subjected to deboronation and subsequent calcination whereafter an additional element is introduced into the zeolitic material, e.g. by a further hydrothermal treatment, but directly calcined, wherein from this direct calcination.

Therefore, the present invention relates to a process for the preparation of a zeolitic material having an MWW framework structure and comprising boron and titanium, the process comprising (i) providing an aqueous synthesis mixture comprising a silica source, a boron source, a titanium source, and an MWW templating agent, at a temperature of the aqueous synthesis mixture of at most 50° C.;

(ii) heating the aqueous synthesis mixture provided in (i) from the temperature of at most 50° C. to a temperature in the range of from 160 to 190° C. within a time period of at most 24 h;

(iii) subjecting the synthesis mixture obtained from the heating according to (ii) to hydrothermal synthesis conditions under autogenous pressure in a closed system at a temperature in the range of from 160 to 190° C., obtaining, in its mother liquor, a precursor of the zeolitic material having an MWW framework structure and comprising boron and titanium;

(iv) separating the precursor of the zeolitic material having an MWW framework structure and comprising boron and titanium from its mother liquor;

(v) calcining the separated precursor of the zeolitic material having an MWW framework structure and comprising boron and titanium obtained from the separating according to (iv), obtaining the zeolitic material having an MWW framework structure and comprising boron and titanium.

Further, it was an object of the present invention to provide a novel, in particular calcined zeolitic material having an MWW framework structure comprising titanium as framework element.

Therefore, the present invention also relates to a zeolitic material, in particular a calcined zeolitic material, having an MWW framework structure and comprising boron and titanium, preferably obtainable or obtained by the process according to the present invention, wherein at least 99 weight-%, preferably at least 99.9 weight-% of the zeolitic framework structure consist of boron, titanium, silicon, oxygen, and hydrogen, and wherein the molar ratio of boron, relative to silicon, is in the range of from 0.05:1 to 0.15:1, and the molar ratio of titanium, relative to silicon, is in the range of from 0.017:1 to 0.025:1.

Step (i)

Generally, there are no specific restrictions how the aqueous synthesis mixture is provided in (i) at a temperature of at most 50° C. wherein this temperature is to be understood as the temperature of the aqueous synthesis mixture.

Preferably, the aqueous synthesis mixture comprising a silica source, a boron source, a titanium source, and an MWW templating agent, is provided at a temperature of the aqueous synthesis mixture in the range of from 5 to 50° C., more preferably of from 10 to 40° C., more preferably of from 15 to 35° C., more preferably of from 20 to 30° C.

Generally, for providing the aqueous synthesis mixture, water, a silica source, a boron source, a titanium source, and an MWW templating agent can be admixed in any suitable order. Preferably, the aqueous synthesis mixture provided in (i) is prepared by adding a silica source to an aqueous mixture comprising a boron source, a titanium source and an MWW templating agent. Generally, there are no specific restrictions how said aqueous mixture comprising the boron source, the titanium source and the MWW templating agent is prepared. Preferably, said aqueous mixture comprising the boron source, the titanium source and the MWW templating agent is prepared by adding a mixture comprising a first portion of the MWW templating agent and the titanium source to an aqueous mixture comprising a second portion of the MWW templating agent and the boron source. More preferably, the mixture comprising the first portion of the MWW templating agent and the titanium source is essentially free of water. The term "essentially free of water" as used in this context of the present invention relates to a mixture which contains water only as an impurity, preferably in an amount of at most 1000 weight-ppm, preferably at most 500 weight-ppm, more preferably at most 100 weight-ppm, based on the total weight of the mixture. Preferably, the mixture comprising a first portion of the MWW templating agent and the titanium source is prepared at a temperature in the range of from 10 to 40° C., more preferably from 15 to 35° C., more preferably from 20 to 30° C. wherein the mixture, during its preparation, can be suitably stirred. Preferably, the aqueous mixture comprising a second portion of the MWW templating agent and the boron source is prepared at a temperature in the range of from 10 to 40° C., more preferably from 15 to 35° C., more preferably from 20 to 30° C. wherein the aqueous mixture, during its preparation, can be suitably agitated, such as stirred.

In particular, the aqueous synthesis mixture provided in (i) is essentially free of any alumina sources. The term "essentially free" as used in this context of the present invention relates to aqueous synthesis mixture which contains aluminum, if at all, only as impurities of the other compounds contained in the aqueous synthesis mixture. Preferably, the aluminum content of the aqueous synthesis mixture provided in (i) is at most 1000 weight-ppm, preferably at most 500 weight-ppm, more preferably at most 100 weight-ppm, based on the total weight of the aqueous synthesis mixture.

Preferably, after adding of the silica source, the resulting aqueous synthesis mixture is agitated, such as stirred, at a temperature of at most 50° C., preferably a temperature in the range of from 10 to 50° C., more preferably from 15 to 45° C., preferably for a time period in the range of from 45 to 180 min, more preferably from 60 to 120 min, more preferably from 80 to 100 min. During adding of the silica source, the aqueous synthesis mixture is suitably agitated. Preferably, the energy introduced by agitation is in the range of from 0.1 to 3 W per kg of the agitated synthesis mixture, preferably of from 0.3 to 2 W per kg of the agitated synthesis mixture, more preferably of from 0.5 to 1.5 W per kg of the agitated synthesis mixture.

As far as (i) is concerned, no specific restrictions exist regarding the starting materials in the form of the silica source, the boron source, the titanium source and the MWW templating agent, provided that these starting materials lead to the formation of the precursor of the zeolitic material having MWW framework structure and comprising boron and titanium which, after calcination according to (v), leads to the zeolitic material having an MWW framework structure and comprising boron and titanium.

The term "MWW templating agent" as used herein refers to a compound or a combination of two or more compounds which leads, after hydrothermal synthesis and calcination, to the formation of a zeolitic framework having the MWW structure. Generally, all suitable MWW templating agents can be employed, provided that they can be removed by the calcination according to (v). Preferably, the MWW templating agent is selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide, and a mixture of two or more thereof, more preferably from the group consisting of piperidine, hexamethylene imine and a mixture thereof, wherein more preferably, the MWW templating agent comprises, more preferably consists of, piperidine.

Preferably, the silica source is selected from the group consisting of fumed silica, colloidal silica, silicon alkoxides, and a mixture of two or more thereof, more preferably from the group consisting of fumed silica, colloidal silica, and a mixture thereof, wherein more preferably, the silica source comprises, more preferably consists of, fumed silica.

Preferably, the boron source is selected from the group consisting of boric acid, borates, boron oxide, and a mixture of two or more thereof, more preferably from the group consisting of boric acid, borates and a mixture thereof, wherein more preferably, the boron source comprises, more preferably consists of, boric acid.

Preferably, the titanium source is selected from the group consisting of titanium alkoxides, titanium halides, titanium dioxide and a mixture of two or more thereof, more preferably from the group consisting of titanium alkoxides, titanium halides and a mixture of two or more thereof, wherein more preferably, the titanium source comprises, more preferably consists of, a titanium alkoxide, more preferably comprises, more preferably consists of, titanium tetrabutoxide.

Therefore, preferably, the silica source is fumed silica, the boron source is boric acid, the titanium source is titanium tetrabutoxide, and the MWW templating agent is piperidine.

As far as the amounts of the silica source, the boron source, the titanium source and the MWW templating agent employed in (i) are concerned, no specific restrictions exist provided that the precursor of the zeolitic material having an MWW framework structure and comprising boron and titanium is obtained under the conditions according to (iii) which, after calcination according to (v), leads to the zeolitic material having an MWW framework structure and comprising boron and titanium.

Preferably, the aqueous synthesis mixture provided in (i) contains the boron source, calculated as elemental boron, relative to the silicon source, calculated as elemental silicon, in a molar ratio in the range of from 0.18:1 to 5.2:1, more preferably from 0.25:1 to 4:1, more preferably from 0.5:1 to 3:1.

Preferably, the aqueous synthesis mixture provided in (i) contains the titanium source, calculated as elemental titanium, relative to the silicon source, calculated as elemental silicon, in a molar ratio in the range of from 0.005:1 to 0.15:1, more preferably from 0.0075:1 to 0.125:1, more preferably from 0.01:1 to 0.1:1.

Preferably, the aqueous synthesis mixture provided in (i) contains the MWW templating agent relative to the silicon source, calculated as elemental silicon, in a molar ratio in the range of from 0.4:1 to 4.2:1, more preferably from 0.5:1 to 3:1, more preferably from 0.6:1 to 2:1.

Preferably, the aqueous synthesis mixture provided in (i) contains the water relative to the silicon source, calculated as elemental silicon, in a molar ratio in the range of from 1:1 to 30:1, more preferably from 1.5:1 to 27:1, more preferably from 2:1 to 25:1.

Thus, preferably, the aqueous synthesis mixture provided in (i) contains the boron source, preferably boric acid, calculated as elemental boron, relative to the silicon source, preferably fumed silica, calculated as elemental silicon, in a molar ratio in the range of from 0.5:1 to 3:1; the titanium source, preferably titanium tetrabutoxide, calculated as elemental titanium, relative to the silicon source, preferably fumed silica, calculated as elemental silicon, in a molar ratio in the range of from 0.01:1 to 0.1:1; the MWW templating agent, preferably piperidine, relative to the silicon source, preferably fumed silica, calculated as elemental silicon, in a molar ratio in the range of from 0.6:1 to 2:1; and the water relative to the silicon source, preferably fumed silica, calculated as elemental silicon, in a molar ratio in the range of from 2:1 to 25:1.

Preferably, at least 99 weight-%, more preferably at least 99.5 weight-%, more preferably at least 99.9 weight-% of the aqueous synthesis mixture provided in (i) consist, prior to (ii), of the silica sources, the titanium sources, the boron source, the MWW templating agent, and the water.

Preferably, the pH of the aqueous synthesis mixture provided in (i) has a pH in the range of from 10 to 13, more preferably from 10.5 to 12.5, more preferably from 11 to 12, as determined by a pH-sensitive glass electrode.

Step (ii)

According to (ii), the aqueous synthesis mixture provided in (i) is heated from the temperature of at most 50° C. to a temperature in the range of from 160 to 190° C. within a time period of at most 24 h.

Generally, the heating can be accomplished by directly heating the mixture, for example by immersing a suitable heating source in the mixture, or by indirectly heating the mixture, for example by heating the walls of the vessel in which the mixture to be heated is contained, or by a combination of these methods. If indirect heating is applied, it is preferred to heat the walls of the vessel by passing a suitably heating source through a jacket which surrounds at least a portion of the wall of the vessel. The temperature and the flow rate of the heating source can be suitably adapted so that the desired temperature of the aqueous synthesis mixture is achieved.

Preferably, the aqueous synthesis mixture provided in (i) is heated from the temperature in the range of from 5 to 50° C., more preferably 10 to 40° C., more preferably from 15 to 35° C., more preferably from 20 to 30° C., to a temperature in the range of from 160 to 190° C. within a time period of at most 24 h.

Preferably, the aqueous synthesis mixture provided in (i) is heated from the temperature of at most 50° C. to a temperature in the range of from 160 to 180° C., more preferably from 165 to 175° C. More preferably, the aqueous synthesis mixture provided in (i) is heated from the temperature in the range of from 10 to 40° C., more preferably from 15 to 35° C., more preferably from 20 to 30° C., to the temperature in the range of from 160 to 180° C., more preferably from 165 to 175° C.

Preferably, the aqueous synthesis mixture provided in (i) is heated from the temperature of at most 50° C. to a temperature in the range of from 160 to 190° C. within a time period of from 1 to 24 h, more preferably from 2 to 18 h, more preferably from 4 to 14 h, more preferably from 8 to 12 h. More preferably, the aqueous synthesis mixture provided in (i) is heated from the temperature of at most 50° C. to a temperature in the range of from 160 to 180° C., more preferably from 165 to 175° C., within a time period in the range of from 1 to 24 h, more preferably from 2 to 18 h, more preferably from 4 to 14 h, more preferably from 8 to 12 h. More preferably, the aqueous synthesis mixture provided in (i) is heated from the temperature in the range of from 10 to 40° C., more preferably from 15 to 35° C., more preferably from 20 to 30° C., to a temperature in the range of from 160 to 190° C., within a time period in the range of from 1 to 24 h, more preferably from 2 to 18 h, more preferably from 4 to 14 h, more preferably from 8 to 12 h. More preferably, the aqueous synthesis mixture provided in (i) is heated from the temperature in the range of from 10 to 40° C., more preferably from 15 to 35° C., more preferably from 20 to 30° C., to the temperature in the range of from 160 to 180° C., more preferably from 165 to 175° C., within a time period in the range of from 1 to 24 h, more preferably from 2 to 18 h, more preferably from 4 to 14 h, more preferably from 8 to 12 h.

Generally, it is conceivable to carry out the heating according to (ii) continuously or semi-continuously in two or more separate steps. Preferably, the heating according to (ii) is carried continuously. The term "continuously" as used in this context of the present invention relates to a heating method according to which, during heating, the temperature of the aqueous synthesis mixture is continuously increased, without any temperature plateaus where the temperature of the aqueous mixture is kept constant or essentially constant during a given period of time.

During heating according to (ii), it is preferred to suitably agitate the aqueous mixture. Preferably, the energy introduced by agitation is in the range of from 0.1 to 3 W per kg of the agitated mixture, preferably of from 0.3 to 2 W per kg of the agitated mixture, more preferably of from 0.5 to 1.5 W per kg of the agitated mixture.

Generally, providing according to (i) and heating according to (ii) can be carried out in one or more suitable vessels. Preferably, the aqueous synthesis mixture is provided in (i) in the same vessel wherein the heating according to (ii) is carried out. More preferably, the aqueous synthesis mixture is provided in (i) in the same vessel wherein the heating according to (ii) and the hydrothermal synthesis according to (iii), as described hereinunder, are carried out. More preferably, the heating according to (ii) and the hydrothermal synthesis according to (iii) are carried out in a closed system, more preferably in an autoclave.

Step (iii)

According to (iii), the synthesis mixture obtained from the heating according to (ii) is subjected to hydrothermal synthesis conditions under autogenous pressure in a closed system at a temperature in the range of from 160 to 190° C., obtaining, in its mother liquor, a precursor of the zeolitic material having an MWW framework structure and comprising boron and titanium.

Preferably, the synthesis mixture obtained from the heating according to (ii) is subjected to hydrothermal synthesis conditions under autogenous pressure in a closed system at a temperature in the range of from 160 to 180° C., more preferably from 165 to 175° C. In contrast to the process according to the prior art involving a complex temperature program, it is preferred according to the present invention that only one temperature is chosen for the hydrothermal synthesis conditions, which temperature is preferably in the range of from 160 to 165° C. or from 165 to 170° C. or from 170 to 175° C. of from 175 to 180° C., more preferably in the range of from 165 to 169° C. or from 167 to 171° C. or from 169 to 173° C. of from 171 to 175° C.

Concerning the duration of the hydrothermal synthesis according to (iii), no specific restrictions exist. Preferably, the synthesis mixture is subjected to hydrothermal synthesis conditions for a time period in the range of from 30 to 200 h, more preferably from h, more preferably from 48 to 160 h.

Therefore, the synthesis mixture obtained from the heating according to (ii) is preferably subjected to hydrothermal synthesis conditions under autogenous pressure in a closed system at a temperature in the range of from 160 to 180° C., more preferably from 165 to 175° C., preferably for a time period in the range of from 30 to 200 h, more preferably from 100 to 180 h, more preferably from 48 to 160 h.

Hence, the present invention also relates to a process as described above, wherein the heating according to (ii) is carried out continuously, preferably in a closed system, more preferably an autoclave, wherein the aqueous synthesis mixture provided in (i) is heated from a temperature in the range of from 10 to 40° C., preferably from 15 to 35° C., more preferably from 20 to 30° C., to a temperature in the range of from 160 to 180° C., preferably from 165 to 175° C., within a time period in the range of from 1 to 24 h, preferably from 2 to 18 h, more preferably from 4 to 14 h, more preferably from 8 to 12 h, and wherein the synthesis mixture obtained from the heating according to (ii) is subjected to hydrothermal synthesis conditions under autogenous pressure in a closed system, preferably an autoclave, at a temperature in the range of from 160 to 180° C., more preferably from 165 to 175° C., for a time period in the range of from 30 to 200 h, preferably from 100 to 180 h, more preferably from 48 to 160 h.

During the hydrothermal synthesis according to (iii), it is preferred to suitably agitate the aqueous mixture. Preferably, the energy introduced by agitation is in the range of from 0.1 to 3 W per kg of the agitated mixture, preferably of from 0.3 to 2 W per kg of the agitated mixture, more preferably of from 0.5 to 1.5 W per kg of the agitated mixture.

During the hydrothermal synthesis according to (iii), the pressure in the autogenous pressure in the closed system, preferably in the autoclave, is in the range of from 2 to 20 bar, more preferably from 4 to 15 bar, more preferably from 6 to 10 bar.

Generally, it is conceivable that the hydrothermal synthesis according to (iii) is carried out in the presence of at least one suitable seeding material such as a zeolitic seeding material having MWW or MWW-type framework structure. Preferably, the hydrothermal synthesis according to (iii) is carried out in the absence of a zeolitic seeding material having MWW or MWW-type framework structure, more preferably in the absence of a zeolitic seeding material, more preferably in the absence of a seeding material.

From the hydrothermal synthesis according to (iii), the precursor of the zeolitic material having an MWW framework structure and comprising boron and titanium is obtained in its mother liquor. After the hydrothermal synthesis, the pressure in the closed system, preferably the autoclave, is preferably suitably released, preferably to ambient pressure. After the hydrothermal synthesis, the temperature of the suspension in the closed system, preferably the autoclave, is preferably decreased, preferably to a value in the range of from 5 to 50° C., more preferably of from 10 to 40° C., more preferably of from 15 to 35° C., more preferably of from 20 to 30° C.

Preferably, the pH of the suspension obtained from (iii) has a pH in the range of from 10 to 13, more preferably from 10.5 to 12.5, more preferably from 11 to 12, as determined by a pH-sensitive glass electrode.

Step (iv)

After hydrothermal synthesis in (iii) and preferably pressure release and temperature decrease, the precursor of the zeolitic material having an MWW framework structure and comprising boron and titanium is separated from its mother liquor according to (iv).

All methods of separating the precursor from its mother liquor are conceivable. These methods include, but are not limited to, filtration, ultrafiltration, diafiltration, centrifugation, evaporation, rapid-drying such as spray drying or spray granulation. A suitable combination of two or more of these methods can be applied.

According to a preferred embodiment of the present invention, the separating according to (iv) comprises spray drying wherein preferably a spray powder is obtained containing the precursor.

According to another preferred embodiment of the present invention, the separating according to (iv) comprises filtration wherein a filter cake is obtained containing the precursor.

According to yet another preferred embodiment of the present invention, the separating according to (iv) comprises filtration wherein a filter cake is obtained containing the precursor, and subjecting the filter cake, preferably after having prepared a suitable suspension therefrom, to rapid-drying such as spray-drying or spray-granulation, preferably to spray-drying, wherein a spray powder is obtained containing the precursor. Suitable solid contents of the suspension to be subjected to rapid-drying, preferably spray-drying, may be in the range of from 5 to 30 weight-% or from 10 to 20 weight-% or from 12.5 to 17.5 weight-%, based on the total weight of the suspension to be subjected to rapid-drying, preferably spray-drying.

Prior to separating the precursor from its mother liquor, it is possible to increase the precursor content of the mother liquor by suitably concentrating the suspension obtained from (iii), for example by evaporation, or to decrease the precursor content of the mother liquor by suitably diluting the suspension obtained from (iii).

Generally, it is conceivable to subject the precursor of the zeolitic material having an MWW framework structure and comprising boron and titanium, separated from its mother liquor by, for example, filtration, or rapid-drying, or filtration and rapid-drying, directly to calcination according to (v). Preferably, prior to (v), the precursor of the zeolitic material having an MWW framework structure and comprising boron and titanium separated from its mother liquor comprises at least one is subjected to washing, or drying, or washing and drying.

Preferably, the separation according to (iv) further comprises a step of (iv.1) washing the precursor of the zeolitic material having an MWW framework structure and comprising boron and titanium.

Regarding the washing agent used for the washing and the washing conditions applied during washing, no specific restrictions exist provided that from the washing, a precursor of the zeolitic material having an MWW framework structure and comprising boron and titanium is obtained which, compared to the precursor before the washing, contains the essentially same amount of boron, titanium, and silicon. Preferably, the washing agent used for the washing according to (iv.1) comprises water. More preferably, the washing agent used for the washing according to (iv.1) essentially consists of water. The term "essentially consists of water" as used in this context of the present invention relates to a deionized water having a pH in the range of from 6.5 to 9, preferably from 7 to 9, as determined by a pH-sensitive glass electrode.

Preferably, the washing according to (iv.1) is carried out until the pH of the washing agent having been used for the washing and comprising water, preferably essentially consisting of water, has a pH of less than 10, as determined by a pH-sensitive glass electrode.

Preferably, the washing according to (iv.1) is carried out at a temperature of the washing agent, preferably the washing agent comprising, preferably essentially consisting of water, in the range of from 5 to 40° C., more preferably from 10 to 35° C., more preferably from 20 to 30° C.

Therefore, the separation according to (iv) preferably further comprises a step of (iv.1) washing the precursor of the zeolitic material having an MWW framework structure and comprising boron and titanium with a washing agent comprising, preferably essentially consisting of water, more preferably being water, until the pH of the washing agent having been used for washing has a pH of less than 10, as determined by a pH-sensitive glass electrode.

Generally, it is conceivable to subject the precursor of the zeolitic material having an MWW framework structure and comprising boron and titanium, separated from its mother liquor by and preferably washed, directly to calcination according to (v). Preferably, prior to (v), the precursor of the zeolitic material having an MWW framework structure and comprising boron and titanium separated from its mother liquor and preferably washed, comprises drying.

Therefore, preferably, the separation according to (iv) further comprises a step of (iv.2) drying the precursor of the zeolitic material having an MWW framework structure and comprising boron and titanium, preferably after washing the precursor of the zeolitic material having an MWW framework structure and comprising boron and titanium.

Regarding the drying conditions applied, no specific restrictions exist provided that from the drying, a precursor of the zeolitic material having an MWW framework structure and comprising boron and titanium is obtained which, compared to the precursor before the drying, contains the essentially same amount of boron, titanium, and silicon. Generally, the drying can be carried out continuously, semi-continuously, or as a batch drying method. Preferably, the drying is carried out at a temperature of the drying atmosphere in the range of from 10 to 150° C., preferably from 20 to 140° C., more preferably from 30 to 130° C. More preferably, the drying is carried out at a temperature of the drying atmosphere in the range of from 40 to 130° C., more preferably from 50 to 130° C., more preferably from 100 to 130° C. The time period during which the drying is carried out is preferably in the range of from 1 to 48 h, more preferably from 6 to 48 h, more preferably from 12 to 48 h. The atmosphere used for drying may comprise an inert gas such as nitrogen, preferably technical nitrogen, or argon or the like. Preferably, the atmosphere used for drying comprises oxygen. Preferred atmospheres include, but are not restricted to, oxygen, air, lean air, and combinations thereof.

Therefore, the separation according to (iv) preferably further comprises a step of (iv.2) drying the precursor of the zeolitic material having an MWW framework structure and comprising boron and titanium, preferably after washing the precursor of the zeolitic material having an MWW framework structure and comprising boron and titanium, at a temperature in the range of from 10 to 150° C., preferably from 20 to 140° C., more preferably from 30 to 130° C., preferably in an atmosphere comprising oxygen.

Thus, the present invention also relates to the process as described above, wherein the separation according to (iv) further comprises (iv.1) optionally washing the precursor of the zeolitic material having an MWW framework structure and comprising boron and titanium;

(iv.2) drying the optionally washed precursor of the zeolitic material having an MWW framework structure and comprising boron and titanium.

Further, the present invention relates to the process as described above, wherein the separation according to (iv) further comprises (iv.1) optionally washing the precursor of the zeolitic material having an MWW framework structure and comprising boron and titanium with a washing agent comprising, preferably essentially consisting of water, more preferably being water, until the pH of the washing agent having been used for washing has a pH of less than 10, as determined by a pH-sensitive glass electrode;

(iv.2) drying the optionally washed precursor of the zeolitic material having an MWW framework structure and comprising boron and titanium, preferably at a temperature in the range of from 10 to 150° C., preferably from 20 to 140° C., more preferably from 30 to 130° C., preferably in an atmosphere comprising oxygen.

If during separation of the precursor of the zeolitic material having an MWW framework structure and comprising boron and titanium, no rapid-drying is carried out, it is conceivable that the drying according to (iv.2) is accomplished by drying includes rapid-drying such as spray-drying or spray-granulation. For example, it is conceivable that the preferably washed precursor of the zeolitic material having an MWW framework structure and comprising boron and titanium, such as the washed filter cake comprising the precursor of the zeolitic material having an MWW framework structure and comprising boron and titanium, is directly subjected to rapid-drying or, prior to rapid-drying, subjected to a preparation of a suitable suspension which is then subjected to rapid-drying wherein suitable solid contents of the suspension to be subjected to rapid-drying, preferably spray-drying, may be in the range of from 5 to 30 weight-% or from 10 to 20 weight-% or from 12.5 to 17.5 weight-%, based on the total weight of the suspension to be subjected to rapid-drying, preferably spray-drying.

Further, if the drying according to (iv.2) does not include rapid-drying, it is possible that after the drying according to (iv.2), the dried precursor is subjected to an additional drying steps, for example by spray-drying or ultrafiltration, provided that from this additional drying, a precursor of the zeolitic material having an MWW framework structure and comprising boron and titanium is obtained which, compared to the precursor before the additional drying, contains the essentially same amount of boron, titanium, and silicon. The additional drying can carried out in a suitable atmosphere such as oxygen, air, lean air, or technical nitrogen. For example, if the additional drying is carried out be spray-drying, the dried precursor, for example in the form of a dried filter cake, can be suspended in a suitable liquid, for example water, to allow for obtaining a sprayable suspension. The solids content of such suspension can be suitably chosen to meet the requirements of the spray-drying. If the additional drying is accomplished by spray-drying, the drying gas inlet temperature can be in the range of from 200 to 250° C., such as from 220 to 250° C., and the drying gas outlet temperature can be in the range of from 100 to 175° C., such as from 120 to 150° C.

Especially preferably, neither prior to nor during (iv), the precursor of the zeolitic material having an MWW framework structure and comprising boron and titanium is treated with an aqueous solution having a pH of at most 6, as determined by a pH-sensitive glass electrode. Thus, especially preferably, neither prior to nor during (iv), the precursor of the zeolitic material having an MWW framework structure and comprising boron and titanium is treated with an inorganic or an organic acid. Further especially preferably, neither prior to nor during (iv), the precursor of the zeolitic material having an MWW framework structure and comprising boron and titanium is treated with steam.

Step (v)

According to (v), the separated precursor of the zeolitic material having an MWW framework structure and comprising boron and titanium obtained from the separating according to (iv), is calcined, obtaining the zeolitic material having an MWW framework structure and comprising boron and titanium. During calcining according to (v), the MWW templating agent is at least partially, preferably essentially completely removed from the MWW framework structure.

The sequence of process steps according to the present invention does not comprise a step according to which the boron content of the precursor subjected to the calcination is essentially decreased before the calcination. Therefore, according to the present invention, the process for the preparation of the zeolitic material having an MWW framework structure and comprising boron and titanium is carried out according to a sequence of steps according to which, after the hydrothermal synthesis according to (iii) and before the calcination according to (v), the boron content and the titanium content of the precursor of the zeolitic material having an MWW framework structure and comprising boron and titanium obtained from (iii) is essentially the same as the boron content and the titanium content of the precursor of the zeolitic material having an MWW framework structure and comprising boron and titanium subjected to the calcination according to (v). The term "essentially the same amount of boron" as used in this context of the present invention refers to a boron content of the precursor subjected to calcination according to (v) which is at least 95%, preferably at least 98%, more preferably at least 99% of the boron content of the precursor obtained from the hydrothermal synthesis according to (iii), calculated as elemental boron. The term "essentially the same amount of titanium" as used in this context of the present invention refers to a titanium content of the precursor subjected to calcination according to (v) which is at least 95%, preferably at least 98%, more preferably at least 99% of the titanium content of the precursor obtained from the hydrothermal synthesis according to (iii), calculated as elemental titanium. Therefore, the present invention also relates to the process as describe above, wherein the boron content of the precursor of the zeolitic material having an MWW framework structure and comprising boron and titanium which is subjected to calcination is at least 95%, preferably at least 98%, more preferably at least 99% of the boron content of the precursor obtained from the hydrothermal synthesis according to (iii), calculated as elemental boron, and wherein the titanium content of the precursor of the zeolitic material having an MWW framework structure and comprising boron and titanium which is subjected to calcination is at least 95%, preferably at least 98%, more preferably at least 99% of the titanium content of the precursor obtained from the hydrothermal synthesis according to (iii), calculated as elemental titanium.

Preferably, according to the present invention, the precursor of the zeolitic material having an MWW framework structure and comprising boron and titanium obtained from (iii) is not treated with an aqueous solution having a pH of at most 6, as determined by a pH-sensitive glass electrode prior to (v). Thus, preferably, prior to (v), the precursor of the zeolitic material having an MWW framework structure and comprising boron and titanium is not treated with an inorganic or an organic acid. Further preferably, prior to (v), the precursor of the zeolitic material having an MWW framework structure and comprising boron and titanium is not treated with steam.

Regarding the calcination conditions applied, no specific restrictions exist provided that from the calcination, the zeolitic material having an MWW framework structure and comprising boron and titanium is obtained which, compared to the precursor before the calcination, contains the essentially same amount of boron and titanium. Generally, the calcination can be carried out continuously, semi-continuously, or as a batch calcination method. Preferably, the calcination is carried out at a temperature of the calcination atmosphere in the range of from 500 to 700° C., more preferably from 550 to 700° C., more preferably from 600 to 700° C., such as from 600 to 650° C. or from 625 to 675° C. or from 650 to 700° C. The time period during which the calcination is carried out is preferably in the range of from 0.1 to 24 h, more preferably from 1 to 18 h, more preferably from 6 to 12 h. The atmosphere used for calcination may comprise an inert gas such as nitrogen, preferably technical nitrogen, or argon or the like. Preferably, the atmosphere used for calcination comprises oxygen. Preferred atmospheres include, but are not restricted to, oxygen, air, lean air, or combinations thereof. Preferably, the calcination temperature is achieved by applying a heating rate in the range of from 0.1 to 4 K/min, more preferably from 0.5 to 3 K/min, more preferably from 1 to 2.5 K/min.

Preferably, after (v), the calcined zeolitic material having an MWW framework structure and comprising boron and titanium is not treated with an aqueous solution having a pH of at most 6, as determined by a pH-sensitive glass electrode. Thus, preferably, after (v), the zeolitic material having an MWW framework structure and comprising boron and titanium is not treated with an inorganic or an organic acid. Further preferably, after (v), the zeolitic material having an MWW framework structure and comprising boron and titanium is not treated with steam.

Preferably, the boron content of the zeolitic material having an MWW framework structure and comprising boron and titanium which is obtained from the calcination according to (v) is at least 95%, preferably at least 98%, more preferably at least 99% of the boron content of the precursor obtained from the hydrothermal synthesis according to (iii). Preferably, the titanium content of the zeolitic material having an MWW framework structure and comprising boron and titanium which is obtained from the calcination according to (v) is at least 95%, preferably at least 98%, more preferably at least 99% of the titanium content of the precursor obtained from the hydrothermal synthesis according to (iii).

The present invention also relates to a zeolitic material having an MWW framework structure and comprising boron and titanium, said zeolitic material being obtainable or obtained by the above described process according to the present invention, said zeolitic material preferably having an MWW framework structure and comprising boron and titanium wherein at least 99 weight-%, more preferably at least 99.9 weight-% of the zeolitic framework structure consist of boron, titanium, silicon, oxygen, and hydrogen, and the molar ratio of boron, calculated as elemental boron, relative to silicon, calculated as elemental silicon, is in the range of from 0.05:1 to 0.15:1, and the molar ratio of titanium, calculated as elemental titanium, relative to silicon, calculated as elemental silicon, is in the range of from 0.017:1 to 0.025:1.

The Zeolitic Material as Such

The present invention further relates to a zeolitic material having an MWW framework structure and comprising boron and titanium, wherein at least 99 weight-%, preferably at least 99.9 weight-% of the zeolitic framework structure consist of boron, titanium, silicon, oxygen, and hydrogen, and wherein the molar ratio of boron, relative to silicon, is in the range of from 0.05:1 to 0.15:1, and the molar ratio of titanium, relative to silicon, is in the range of from 0.017:1 to 0.025:1.

In particular, the zeolitic material having an MWW framework structure and comprising boron and titanium according to the present invention is present in its calcined state. Therefore, the present invention further relates to a calcined zeolitic material having an MWW framework structure and comprising boron and titanium, wherein at least 99 weight-%, preferably at least 99.9 weight-% of the zeolitic framework structure consist of boron, titanium, silicon, oxygen, and hydrogen, and wherein the molar ratio of boron, relative to silicon, is in the range of from 0.05:1 to 0.15:1, and the molar ratio of titanium, relative to silicon, is in the range of from 0.017:1 to 0.025:1.

The term "in its calcined state" as used in this context of the present invention describes a zeolitic material which, having been present in a non-calcined state, has been subjected to a calcination at a temperature preferably in the range of from 500 to 700° C., more preferably from 550 to 700° C., more preferably from 600 to 700° C., preferably for time period in the range of from 0.1 to 24 h, more preferably from 1 to 18 h, more preferably from 6 to 12 h, preferably in an atmosphere comprising oxygen. Therefore, the present invention also relates to the zeolitic material in its calcined state as described above, wherein the calcined state of the zeolitic material is achieved by subjecting the zeolitic material in its non-calcined state to a calcination at a temperature in the range of from 500 to 700° C., more preferably from 550 to 700° C., more preferably from 600 to 700° C., preferably for time period in the range of from 0.1 to 24 h, more preferably from 1 to 18 h, more preferably from 6 to 12 h, preferably in an atmosphere comprising oxygen. In particular, the present invention relates to the zeolitic material in its calcined state as described above, wherein the calcined state of the zeolitic material is achieved by subjecting the zeolitic material in its non-calcined state to a calcination at a temperature in the range of from 600 to 700° C. for time period in the range of from 6 to 12 h in an atmosphere comprising oxygen, preferably air.

As mentioned above, during calcination of the zeolitic material, the MWW templating agent is at least partially, preferably essentially completely removed. Therefore, the present invention also relates to the zeolitic material as described above, having an MWW templating agent content of at most 0.5 weight-%, preferably at most 0.2 weight-%, more preferably at most 0.1 weight-%, based on the total weight of the calcined zeolitic material, said MWW templating agent content being determined as the total organic carbon (TOC) content of the calcined zeolitic material.

Preferably, the zeolitic material according to the present invention exhibits a $^{29}$Si-NMR spectrum, determined according to Reference Example 2, which comprises a first signal in the range of from −95.0 to −105.0 ppm, a second signal in the range of from −105.0 to −115.0 ppm, a third signal in the range of from −115.0 to −125.0 ppm.

More preferably, in this $^{29}$Si-NMR spectrum, the ratio of the integral of the range of the first signal relative to the integral of the range of the third signal is preferably within a range from 0.6 to 1.1, more preferably from 0.7 to 1.0, more preferably from 0.8 to 0.9.

Preferably, the zeolitic material according to the present invention exhibits an $^{11}$B-NMR spectrum, determined according to Reference Example 1, which comprises
a first signal in the range of from 20.0 to 10.0 ppm,
a second signal in the range of from 10.0 to 1.0 ppm, preferably with a peak in the range of from 6.5 to 5.5 ppm, preferably from 6.2 to 5.8 ppm,
a third signal in the range of from 1.0 to −7.0 ppm, preferably with a peak in the range of from −2.4 to −3.4 ppm, preferably from −2.7 to −3.1 ppm,
a fourth signal in the range of from −7.0 to −16.0 ppm.

More preferably, in this $^{11}$B-NMR spectrum, the ratio of the integral of the range of the third signal relative to the integral of the range of the second signal is preferably within a range from 1.00 to 1.15, more preferably from 1.05 to 1.15, more preferably from 1.10 to 1.15.

Preferably, the zeolitic material according to the present invention has a water uptake, determined according to Reference Example 3, in the range of from 12.0 to 16.0 weight-%, preferably from 12.0 to 15.0 weight-%, more preferably from 12.0 to 14.0 weight-%.

Preferably, the zeolitic material according to the present invention has a BET specific surface in the range of from 400 to 500 m$^2$/g, preferably from 410 to 490 m$^2$/g, more preferably from 420 to 480 m$^2$/g, as determined according DIN 66131.

Preferably, the zeolitic material according to the present invention exhibits an infrared spectrum which comprises a band at 3748+/−20 cm$^{-1}$, a band at 3719+/−20 cm$^{-1}$, a band at 3689+/−20 cm$^{-1}$, a band at 3623+/−20 cm$^{-1}$, a band at 3601+/−20 cm$^{-1}$ and a band at 3536+/−20 cm$^{-1}$.

Preferably, the zeolitic material according to the present invention is characterized by an XRD spectrum comprising peaks at 2 theta diffraction angles of (7.2±0.1°), (14.5±0.1°), (22.1±0.1°), (22.7±0.1°), (23.0±0.1°), (24.0±0.1°), (25.3±0.1°), (26.3±0.1°), (27.3±0.1°), (28.1±0.1°). More preferably, the zeolitic material according to the present invention is characterized by an XRD spectrum additionally comprising peaks at 2 theta diffraction angles of (7.0±0.1°), (8.1±0.1°), (10.1±0.1°), (14.3±0.1°), (20.4±0.1°), (21.9±0.1°), (28.9±0.1°), (33.8±0.1°), (47.0±0.1°), (65.4±0.1°), (66.4±0.1°).

Preferably, the zeolitic material of the present invention has a boron content, calculated as elemental boron, in the range of from 1.0 to 2.0 weight-%, preferably from 1.1 to 1.8 weight-%, more preferably from 1.2 to 1.6 weight-%, such as from 1.2 to 1.5 weight-% or from 1.2 to 1.4 weight-%, based on the total weight of the zeolitic material.

Preferably, the zeolitic material of the present invention has a titanium content, calculated as elemental titanium, in the range of from 1.0 to 2.0 weight-%, preferably from 1.1 to 1.8 weight-%, more preferably from 1.2 to 1.6 weight-%, such as from 1.2 to 1.5 weight-% or from 1.2 to 1.4 weight-%, based on the total weight of the zeolitic material.

Therefore, the present invention also relates to a zeolitic material as described above, having a boron content, calculated as elemental boron, in the range of from 1.2 to 1.5 weight-%, preferably from 1.2 to 1.4 weight-%, and a titanium content, calculated as elemental titanium, in the range of from 1.2 to 1.5 weight-%, preferably from 1.2 to 1.4 weight-%, based on the total weight of the zeolitic material.

Preparation of a Molding

Depending on the type of reaction and the kind of chemical process wherein the zeolitic material of the present invention is employed, for example as a catalyst, a molecular sieve, an adsorbent, or the like, it may be necessary to use it not in the form of the zeolitic material as described above, but in the form of a molding comprising the zeolitic material as described above. For example, if the zeolitic material is employed in a continuous process, such as in a continuous process in a fixed-bed reactor, it may be preferred to employ the zeolitic material comprised in a molding.

For preparing a molding, no specific restrictions exist. Preferably, in case a molding is prepared, the process of the present invention further comprises (vi) shaping the zeolitic material having an MWW framework structure and comprising boron and titanium obtained from (v), obtaining a molding;
(vii) optionally drying and/or calcining the molding obtained from (vi).

For the shaping according to (vi), it is preferred to provide the zeolitic material in the form of a moldable mixture comprising the present zeolitic material obtained from (v), wherein the moldable mixture optionally comprises a binder or a binder precursor.

In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays or mixtures of two or more of these oxides or mixed oxides of at least two of Si, Al, Ti, Zr, and Mg. Clay minerals and naturally occurring or synthetically produced alumina, such as, for example, alpha-, beta-, gamma-, delta-, eta-, kappa-, chi- or theta-alumina and their inorganic or organometallic precursor compounds, such as, for example, gibbsite, bayerite, boehmite or pseudoboehmite or trialkoxyaluminates, such as, for example, aluminum triisopropylate, are particularly preferred as $Al_2O_3$ binders. Further conceivable binders might be amphiphilic compounds having a polar and a non-polar moiety and graphite. Further binders might be, for example, clays, such as, for example, montmorillonites, kaolins, metakaolin, hectorite, bentonites, halloysites, dickites, nacrites or anaxites. These binders can be used as such or in the form of suitable precursor compounds which, either during spray-drying and/or the subsequent calcination form the desired binder. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate. In the context of the present invention binders which either completely or partly comprise $SiO_2$, or which are a precursor of $SiO_2$, from which $SiO_2$ is formed, are preferred. In this context, both colloidal silica and so-called "wet process" silica and so-called "dry process" silica can be used. This silica may be amorphous silica, the size of the silica particles being, for example, in the range of from 5 to 100 nm and the surface area of the silica particles being in the range of from 50 to 500 m²/g. Colloidal silica, preferably as an alkaline and/or ammoniacal solution, more preferably as an ammoniacal solution, is commercially available, inter alia, for example as Ludox®, Syton®, Nalco® or Snowtex®. "Wet process" silica is commercially available, inter alia, for example as Hi-Sil®, Ultrasil®, Vulcasil®, Santocel®, Valron-Estersil®, Tokusil® or Nipsil®. "Dry process" silica is commercially available, inter alia, for example as Aerosil®, Reolosil®, Cab-O-Sil®, Fransil® or ArcSilica®. Inter alia, an ammoniacal solution of colloidal silica can be preferred.

As to the ratio of the amount of present zeolitic material relative to the amount of binder used for preparing a molding, it generally can be freely chosen. Generally, the weight ratio of the present zeolitic material relative to binder is in the range of from 20:1 to 1:20, preferably from 10:1 to 1:10.

For preparing a molding based on the zeolitic material according to the present invention, at last one pasting agent can be used to provide for an improved processability of the moldable mixture. Conceivable pasting agents are, among others, organic, in particular hydrophilic polymers, such as, for example, carbohydrates like cellulose, cellulose derivatives, such as, for example, methyl cellulose, and starch, such as, for example, potato starch, wallpaper plaster, polyacrylates, polymethacrylates, polyvinyl alcohol, polyvinylpyrrolidone, polyisobutene or polytetrahydrofuran. The use of water, alcohols or glycols or mixtures thereof, such as mixtures of water and alcohol, or water and glycol, such as for example water and methanol, or water and ethanol, or water and propanol, or water and propylene glycol, as pasting agents may be mentioned. Preferably, carbohydrates such as cellulose, cellulose derivatives, water and mixtures of two or more of these compounds, such as water and cellulose or water and cellulose derivatives are used as pasting agent. Preferably, the at least one pasting agent is removed by drying and/or calcination, as further described below.

As to the ratio of the amount of present zeolitic material relative to the amount of pasting agent used for preparing a molding, it generally can be freely chosen. Generally, the weight ratio of the present zeolitic material relative to pasting agent is in the range of from 20:1 to 1:50, preferably from 10:1 to 1:40.

It is further conceivable that a pore-forming agent, in particular a mesopore-forming agent is additionally employed for the preparation of the moldings. Such pore forming agents usually employed are preferably polymeric vinyl compounds, such as, for example, polyalkylene oxides, such as polyethylene oxides, polystyrenes, polyacrylates, polymethacrylates, polyolefins, polyamides and polyesters.

The moldings of the present invention may be shaped in (vi) in every conceivable geometry such as strands, for example having rectangular, triangular hexagonal, quadratic, oval, or circular cross-section, stars, tablets, spheres, hollow cylinders, and the like. Depending on the specific geometry, the shaping process according to (vi) will be chosen. If, according to a preferred embodiment of the present invention, strands are prepared, the shaping according to (vi) preferably comprises subjecting a moldable mixture comprising the present zeolitic material and optionally a binder or a binder precursor to extrusion. Suitable extrusion apparatuses are described, for example, in "Ullmann's Enzyklopadie der Technischen Chemie", 4$^{th}$ edition, vol. 2, page 295 et seq., 1972. In addition to the use of an extruder, an extrusion press can also be used for the preparation of the moldings. If necessary, the extruder can be suitably cooled during the extrusion process. Extrusion processes are conceivable wherein per batch, the power consumption is in the range of from 1 to 10 A, preferably from 1.5 to 6 A, more preferably from 2 to 4 A. The strands leaving the extruder via the extruder die head can be mechanically cut by a suitable wire or via a discontinuous gas stream.

The molding obtained from (vi) is optionally dried and/or calcined. Therefore, the molding can be dried, and not be subjected to calcination. Further, the molding can be calcined, and not be subjected to drying. Yet further, the molding can be dried and calcined.

No specific restrictions exist concerning the drying and calcination conditions. Conceivable drying conditions include, but are not restricted to, temperatures in the range of from 80 to 160° C., from 90 to 155° C., or from 100 to 150° C., and durations in the range of from 6 to 24 h, from 8 to 20 h, or from 10 to 20 h. The drying can be effected under any suitable gas atmosphere, wherein nitrogen, air and/or lean air are to be mentioned. The calcination conditions include, but are not restricted to, temperatures in the range of from 400 to 650° C., from 450 to 625° C., or from 500 to 600° C., and durations in the range of from 0.25 to 6 h, 0.5 to 5 h, or from 0.5 to 2 h. The calcination can be effected under any suitable gas atmosphere, wherein air and/or lean air are to be mentioned. Preferably during drying and/or calcination, the pore-forming agent and/or the pasting agent, if used, are at least partially, preferably essentially completely removed from the molding.

Therefore, the present invention also relates to a molding, comprising the present zeolitic material according to the present invention and optionally at least one binder.

Preferably, neither prior to nor during (vi), the zeolitic material having an MWW framework structure and comprising boron and titanium is treated with an aqueous solution having a pH of at most 6, as determined by a pH-sensitive glass electrode. Preferably, after (vi), in particular during and after the sequence of steps (vi) and (vii), the molding comprising the zeolitic material having an MWW framework structure and comprising boron and titanium is not treated with an aqueous solution having a pH of at most 6, as determined by a pH-sensitive glass electrode. Further preferably, neither prior to nor during (vi), nor during and after the sequence of steps (vi) and (vii), the molding comprising the zeolitic material having an MWW framework structure and comprising boron and titanium is treate with steam.

Further preferably, prior to (vi), the zeolitic material having an MWW framework structure and comprising boron and titanium is not treated by one or more methods which lead to a significant removal of boron from the zeolitic material, and wherein during and after the sequence of steps (vi) to (vii), the molding comprising the zeolitic material having an MWW framework structure and comprising boron and titanium is not treated by one or more methods which lead to a significant removal of boron or titanium from the zeolitic material. The term "significant removal of boron" as used in this context of the present invention relates to a removal of boron according to which the zeolitic material, after the respective treatment, has a boron content, calculated as elemental boron, which is decreased for 5 weight-%, preferably 2 weight-%, more preferably 1 weight-%. The term "significant removal of titanium" as used in this context of the present invention relates to a removal of titanium according to which the zeolitic material, after the respective treatment, has a titanium content, calculated as elemental titanium, which is decreased for 5 weight-%, preferably 2 weight-%, more preferably 1 weight-%.

Therefore, the present invention also relates to the process as described above, wherein the boron content of the zeolitic material having an MWW framework structure and comprising boron and titanium comprised in the molding obtained from (vi) or (vii), preferably (vii), is at least 95%, preferably at least 98%, more preferably at least 99% of the boron content of the precursor obtained from the hydrothermal synthesis according to (iii), and wherein the titanium content of the zeolitic material having an MWW framework structure and comprising boron and titanium comprised in the molding obtained from (vi) or (vii), preferably (vii), is at least 95%, preferably at least 98%, more preferably at least 99% of the titanium content of the precursor obtained from the hydrothermal synthesis according to (iii)

Uses

The zeolitic material of the present invention having an MWW framework structure comprising boron and titanium and/or the molding of the present invention comprising the present zeolitic materials having an MWW framework structure comprising boron and titanium can be used for every conceivable purpose such as a catalytically active agent, a catalyst support, a molecular sieve, an adsorbent, a filler, and the like.

Preferably, the zeolitic material of the present invention having an MWW framework structure comprising boron and titanium and/or the molding of the present invention comprising the present zeolitic materials having an MWW framework structure comprising boron and titanium is/are used as a catalyst or a catalyst component, preferably in an oxidation reaction, more preferably in an organic oxidation reaction, more preferably in an organic oxidation reaction wherein hydrogen peroxide, employed as such or being formed in situ, is used as an oxidation agent, more preferably in an organic oxidation reaction wherein hydrogen peroxide, employed as such or being formed in situ, is used as an oxidation agent preferably for the oxidation of an alkene, more preferably a cycloalkene, more preferably cyclohexene.

More preferably, the zeolitic material of the present invention having an MWW framework structure comprising boron and titanium and/or the molding of the present invention comprising the present zeolitic materials having an MWW framework structure comprising boron and titanium is/are used as catalyst in a process for preparing a compound of formula (I)

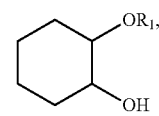

(I)

wherein $R_1$ is an alkyl residue having 1 to 4 carbon atoms, such as 1, 2, 3 or 4 carbon atoms, preferably 1, 2, or 3 carbon atoms, more preferably 1 or 2 carbon atoms, which process comprises the steps (i) providing a liquid mixture containing cyclohexene, an alcohol $R_1OH$, hydrogen peroxide, and optionally a solvent;

(ii) converting the cyclohexene with the hydrogen peroxide and the alcohol $R_1OH$ in the mixture provided according to (i) in the presence of a catalyst containing the zeolitic material according to the present invention having an MWW framework and comprising boron and titanium, obtaining a mixture containing the compound of formula (I).

Further, the present invention relates to an oxidation reaction, preferably an organic oxidation reaction, more preferably an organic oxidation reaction wherein hydrogen peroxide, employed as such or being formed in situ, is employed as an oxidation agent, more preferably an organic oxidation reaction wherein hydrogen peroxide, employed as such or being formed in situ, is employed as an oxidation agent preferably for the oxidation of an alkene, preferably a cycloalkene, more preferably cyclohexene, wherein the zeolitic material of the present invention having an MWW framework structure comprising boron and titanium and/or the molding of the present invention comprising the present zeolitic materials having an MWW framework structure comprising boron and titanium is/are used as oxidation catalyst or as oxidation catalyst component, preferably as oxidation catalyst.

Yet further, the present invention relates to a process for preparing a compound of formula (I)

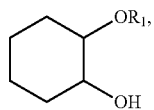

wherein $R_1$ is an alkyl residue having 1 to 4 carbon atoms, which process comprises the steps of:

(i) providing a liquid mixture containing cyclohexene, an alcohol $R_1OH$, hydrogen peroxide, and optionally a solvent;

(ii) converting the cyclohexene with the hydrogen peroxide and the alcohol $R_1OH$ in the mixture provided according to (i) in the presence of a catalyst containing the zeolitic material according to the present invention having an MWW framework and comprising boron and titanium, obtaining a mixture containing the compound of formula (I).

In particular, the zeolitic material of the present invention having an MWW framework structure comprising boron and titanium and/or the molding of the present invention comprising the present zeolitic material having an MWW framework structure comprising boron and titanium is/are preferably used as an at least bifunctional catalyst, more preferably as an epoxidation and ring-opening catalyst or as an epoxidation and etherification catalyst or as a ring-opening and etherification catalyst, more preferably as a trifunctional catalyst, more preferably as an epoxidation and ring-opening and etherification catalyst.

The present invention is further illustrated by the following embodiments and combination of embodiments resulting from the dependencies and references as indicated:

1. A process for the preparation of a zeolitic material having an MWW framework structure and comprising boron and titanium, the process comprising
   (i) providing an aqueous synthesis mixture comprising a silica source, a boron source, a titanium source, and an MWW templating agent, at a temperature of the aqueous synthesis mixture of at most 50° C.;
   (ii) heating the aqueous synthesis mixture provided in (i) from the temperature of at most 50° C. to a temperature in the range of from 160 to 190° C. within a time period of at most 24 h;
   (iii) subjecting the synthesis mixture obtained from the heating according to (ii) to hydrothermal synthesis conditions under autogenous pressure in a closed system at a temperature in the range of from 160 to 190° C., obtaining, in its mother liquor, a precursor of the zeolitic material having an MWW framework structure and comprising boron and titanium;
   (iv) separating the precursor of the zeolitic material having an MWW framework structure and comprising boron and titanium from its mother liquor;
   (v) calcining the separated precursor of the zeolitic material having an MWW framework structure and comprising boron and titanium obtained from the separating according to (iv), obtaining the zeolitic material having an MWW framework structure and comprising boron and titanium.

2. The process of embodiment 1, wherein the aqueous synthesis mixture provided in (i) is prepared by adding the silica source to an aqueous mixture comprising the boron source, the titanium source and the MWW templating agent.

3. The process of embodiment 2, wherein the aqueous mixture comprising the boron source, the titanium source and the MWW templating agent is prepared by adding a mixture comprising a portion of the MWW templating agent and the titanium source to an aqueous mixture comprising a portion of the MWW templating agent and the boron source, wherein preferably, the mixture comprising a portion of the MWW templating agent and the titanium source does not contain water.

4. The process of embodiment 2 or 3, wherein after adding the silica source, the aqueous synthesis mixture is stirred at the temperature of at most 50° C. for a time period in the range of from 45 to 180 min, preferably from 60 to 120 min, more preferably from 80 to 100 min.

5. The process of any of embodiments 1 to 4, wherein according to (i),
   the silica source is selected from the group consisting of fumed silica, colloidal silica, silicon alkoxides, and a mixture of two or more thereof, preferably from the group consisting of fumed silica, colloidal silica and a mixture thereof, wherein more preferably, the silica source is fumed silica;
   the boron source is selected from the group consisting of boric acid, borates, boron oxide, and a mixture of two or more thereof, preferably from the group consisting of boric acid, borates and a mixture thereof, wherein more preferably, the boron source is boric acid;
   the titanium source is selected from the group consisting of titanium alkoxides, titanium halides, titanium salts, titanium dioxide and a mixture of two or more thereof, preferably from the group consisting of titanium alkoxides, titanium halides and a mixture of two or more thereof, wherein more preferably, the titanium source is a titanium alkoxide, more preferably titanium tetrabutoxide;

the MWW templating agent is selected from the group consisting of piperidine, hexamethylene imine, N,N,N,N',N',N'-hexamethyl-1,5-pentanediammonium ion, 1,4-bis(N-methylpyrrolidinium)butane, octyltrimethyl-ammonium hydroxide, heptyltrimethyl-ammonium hydroxide, hexyltrimethylammonium hydroxide, and a mixture of two or more thereof, wherein preferably, preferably from the group consisting of piperidine, hexamethyleneimine and a mixture thereof, wherein more preferably, the MWW templating agent is piperidine.

6. The process of any of embodiments 1 to 5, wherein the aqueous synthesis mixture provided in (i) contains
   the boron source, calculated as elemental boron, relative to the silicon source, calculated as elemental silicon, in a molar ratio in the range of from 0.18:1 to 5.2:1, preferably from 0.5:1 to 3:1;
   the titanium source, calculated as elemental titanium, relative to the silicon source, calculated as elemental silicon, in a molar ratio in the range of from 0.005:1 to 0.15:1, preferably from 0.01:1 to 0.1:1;
   the MWW templating agent relative to the silicon source, calculated as elemental silicon, in a molar ratio in the range of from 0.4:1 to 4.2:1, preferably from 0.6:1 to 2:1;
   the water relative to the silicon source, calculated as elemental silicon, in a molar ratio in the range of from 1:1 to 30:1, preferably from 2:1 to 25:1.

7. The process of any of embodiments 1 to 6, wherein the aqueous synthesis mixture provided in (i) has a pH in the range of from 10 to 13, preferably from 10.5 to 12.5, more preferably from 11 to 12, as determined by a pH-sensitive glass electrode.

8. The process of any of embodiments 1 to 7, wherein in (ii), the heating of the aqueous synthesis mixture provided in (i) from the temperature of at most 50° C. to a temperature in the range of from 160 to 190° C. is carried out for the time period in the range of from 2 to 18 h, preferably from 4 to 14 h, more preferably from 8 to 12 h, preferably under stirring.

9. The process of any of embodiments 1 to 8, wherein in (ii), the mixture provided in (i) is heated continuously from the temperature of at most 50° C. to a temperature in the range of from 160 to 190° C.

10. The process of any of embodiments 1 to 9, wherein in (iii), the synthesis mixture is subjected to hydrothermal synthesis conditions at autogenous pressure for a time period in the range of from 80 to 200 h, preferably from 100 to 180 h, more preferably from 120 to 160 h, preferably at least partially under stirring.

11. The process of any of embodiments 1 to 10, wherein the separating according to (iv) comprises
    (iv.1) washing the precursor of the zeolitic material having an MWW framework structure and comprising boron and titanium, preferably with water until the pH of the water having been used for washing has a pH of less than 10, as determined by a pH-sensitive glass electrode;
    (iv.2) drying the washed precursor of the zeolitic material having an MWW framework structure and comprising boron and titanium, preferably at a temperature in the range of from 10 to 150° C., preferably from 20 to 140° C., more preferably from 30 to 130° C., preferably in an atmosphere comprising oxygen.

12. The process of any of embodiments 1 to 11, wherein neither prior to nor during (iv), the precursor of the zeolitic material having an MWW framework structure and comprising boron and titanium is treated with an aqueous solution having a pH of at most 6, as determined by a pH-sensitive glass electrode.

13. The process of any of embodiments 1 to 12, wherein in (v), the calcining is carried out at a temperature in the range of from 500 to 700° C., more preferably from 550 to 700° C., more preferably from 600 to 700° C., preferably for a time period in the range of from 0.1 to 24 h, more preferably from 1 to 18 h, more preferably from 6 to 12 h.

14. The process of any of embodiments 1 to 13, wherein prior to (v), the precursor of the zeolitic material having an MWW framework structure and comprising boron and titanium, obtained from (iii), is not treated with an aqueous solution having a pH of at most 6, as determined by a pH-sensitive glass electrode, and wherein after (v), the calcined zeolitic material having an MWW framework structure and comprising boron and titanium is not treated with an aqueous solution having a pH of at most 6, as determined by a pH-sensitive glass electrode.

15. The process of any of embodiments 1 to 14, wherein the boron content of the precursor of the zeolitic material having an MWW framework structure and comprising boron and titanium which is subjected to calcination is at least 90%, preferably at least 95%, more preferably at least 98% of the boron content of the precursor obtained from the hydrothermal synthesis according to (iii).

16. The process of any of embodiments 1 to 15, wherein the boron content of the zeolitic material having an MWW framework structure and comprising boron and titanium which is obtained from the calcination according to (v) is at least 90%, preferably at least 95%, more preferably at least 98% of the boron content of the precursor obtained from the hydrothermal synthesis according to (iii).

17. The process of any of embodiments 1 to 16, further comprising
    (vi) shaping the zeolitic material having an MWW framework structure and comprising boron and titanium obtained from (v), obtaining a molding;
    (vii) optionally drying and/or calcining the molding obtained from (vi).

18. The process of embodiment 17, wherein prior to (vi), the zeolitic material having an MWW framework structure and comprising boron and titanium is not treated with an aqueous solution having a pH of at most 6, as determined by a pH-sensitive glass electrode, and wherein during and after the sequence of steps (vi) to (vii), the molding comprising the zeolitic material having an MWW framework structure and comprising boron and titanium is not treated with an aqueous solution having a pH of at most 6, as determined by a pH-sensitive glass electrode.

19. The process of embodiment 17 or 18, wherein the boron content of the zeolitic material having an MWW framework structure and comprising boron and titanium comprised in the molding obtained from (vi) or (vii), preferably (vii), is at least 90%, preferably at least 95%, more preferably at least 98% of the boron content of the precursor obtained from the hydrothermal synthesis according to (iii).

20. A zeolitic material having an MWW framework structure and comprising boron and titanium, obtainable or obtained by a process according to any of embodiments 1 to 16.

21. The zeolitic material of embodiment 20, wherein at least 99 weight-%, preferably at least 99.9 weight-% of the zeolitic framework structure consist of boron, titanium, silicon, oxygen, and hydrogen, and wherein the molar ratio of boron, relative to silicon, is in the range of from 0.05:1 to 0.15:1, and the molar ratio of titanium, relative to silicon, is in the range of from 0.017:1 to 0.025:1.

22. A zeolitic material having an MWW framework structure and comprising boron and titanium, optionally obtainable or obtained by a process according to any of embodiments 1 to 20, wherein at least 99 weight-%, preferably at least 99.9 weight-% of the zeolitic framework structure consist of boron, titanium, silicon, oxygen, and hydrogen, and wherein the molar ratio of boron, relative to silicon, is in the range of from 0.05:1 to 0.15:1, and the molar ratio of titanium, relative to silicon, is in the range of from 0.017:1 to 0.025:1.

23. The zeolitic material of embodiment 22, wherein said zeolitic material is in its calcined state.

24. The zeolitic material of embodiment 23, wherein the calcined state of the zeolitic material is achieved by subjecting the zeolitic material in its non-calcined state to a calcination at a temperature in the range of from 500 to 700° C., more preferably from 550 to 700° C., more preferably from 600 to 700° C., preferably for time period in the range of from 0.1 to 24 h, more preferably from 1 to 18 h, more preferably from 6 to 12 h, preferably in an atmosphere comprising oxygen.

25. The zeolitic material of any of embodiments 22 to 24, having an MWW templating agent content of at most 0.5 weight-%, preferably at most 0.2 weight-%, more preferably at most 0.1 weight-%, based on the total weight of the zeolitic material, said MWW templating agent content being determined as the total organic carbon (TOC) content of the calcined zeolitic material.

26. The zeolitic material of any of embodiments 22 to 25, wherein the $^{29}$Si-NMR spectrum of the zeolitic material comprises
a first signal in the range of from −95.0 to −105.0 ppm,
a second signal in the range of from −105.0 to −115.0 ppm,
a third signal in the range of from −115.0 to −125.0 ppm,
wherein the ratio of the integral of the range of the first signal relative to the integral of the range of the third signal is preferably within a range from 0.6 to 1.1, more preferably from 0.7 to 1.0, more preferably from 0.8 to 0.9.

27. The zeolitic material of any of embodiments 22 to 26, wherein the $^{11}$B-NMR spectrum of the zeolitic material comprises
a first signal in the range of from 20.0 to 10.0 ppm,
a second signal in the range of from 10.0 to 1.0 ppm, preferably with a peak in the range of from 6.5 to 5.5 ppm, preferably from 6.2 to 5.8 ppm,
a third signal in the range of from 1.0 to −7.0 ppm, preferably with a peak in the range of from −2.4 to −3.4 ppm, preferably from −2.7 to −3.1 ppm,
a fourth signal in the range of from −7.0 to −16.0 ppm,
wherein the ratio of the integral of the range of the third signal relative to the integral of the range of the second signal is preferably within a range from 1.00 to 1.15, more preferably from 1.05 to 1.15, more preferably from 1.10 to 1.15.

28. The zeolitic material of any of embodiments 22 to 27, having a water uptake in the range of from 12.0 to 16.0 weight-%, preferably from 12.0 to 15.0 weight-%, more preferably from 12.0 to 14.0 weight-%.

29. The zeolitic material of any of embodiments 22 to 28, having a BET specific surface in the range of from 400 to 500 m²/g, preferably from 410 to 490 m²/g, more preferably from 420 to 480 m²/g, as determined according DIN 66131.

30. The zeolitic material of any of embodiments 22 to 29, wherein the infrared spectrum of the zeolitic material comprises a band at 3748+/−20 cm$^{-1}$, a band at 3719+/−20 cm$^{-1}$, a band at 3689+/−20 cm$^{-1}$, a band at 3623+/−20 cm$^{-1}$, a band at 3601+/−20 cm$^{-1}$ and a band at 3536+/−20 cm$^{-1}$.

31. The zeolitic material of any of embodiments 22 to 30, characterized by an XRD spectrum comprising peaks at 2 theta diffraction angles of (7.2±0.1°), (14.5±0.1°), (22.1±0.1°), (22.7±0.1°), (23.0±0.1°), (24.0±0.1°), (25.3±0.1°), (26.3±0.1°), (27.3±0.1°), (28.1±0.1°).

32. The zeolitic material of embodiment 31, characterized by an XRD spectrum additionally comprising peaks at 2 theta diffraction angles of (7.0±0.1°), (8.1±0.1°), (10.1±0.1°), (14.3±0.1°), (20.4±0.1°), (21.9±0.1°), (28.9±0.1°), (33.8±0.1°), (47.0±0.1°), (65.4±0.1°), (66.4±0.1°).

33. The zeolitic material of any of embodiments 20 to 32, having a boron content, calculated as elemental boron, in the range of from 1.0 to 2.0 weight-%, preferably from 1.1 to 1.8 weight-%, more preferably from 1.2 to 1.6 weight-%, based on the total weight of the zeolitic material.

34. The zeolitic material of any of embodiments 20 to 33, having a titanium content, calculated as elemental titanium, in the range of from 1.0 to 2.0 weight-%, preferably from 1.1 to 1.8 weight-%, more preferably from 1.2 to 1.6 weight-%, based on the total weight of the zeolitic material.

35. The zeolitic material of any of embodiments 20 to 34, having a boron content, calculated as elemental boron, in the range of from 1.2 to 1.5 weight-% and a titanium content, calculated as elemental titanium, in the range of from 1.2 to 1.5 weight-%, based on the total weight of the zeolitic material.

36. The zeolitic material of any of embodiments 20 to 35, comprised in a molding, said molding optionally additionally containing at least one binder.

37. A molding, comprising the zeolitic material according to any of embodiments 20 to 35 and optionally at least one binder, preferably a silica binder.

38. Use of a zeolitic material according to any of embodiments 20 to 36 or a molding according to embodiment 37 as a catalyst or a catalyst component, preferably in an oxidation reaction, more preferably in an organic oxidation reaction, more preferably in an organic oxidation reaction wherein hydrogen peroxide, employed as such or being formed in situ, is used as an oxidation agent, more preferably in an organic oxidation reaction wherein hydrogen peroxide, employed as such or being formed in situ, is used as an oxidation agent preferably for the oxidation of an alkene, more preferably a cycloalkene, more preferably cyclohexene.

39. The use of embodiment 38, wherein the zeolitic material or the molding is used as catalyst in a process for preparing a compound of formula (I)

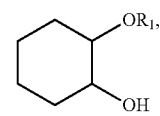

(I)

wherein $R_1$ is an alkyl residue having 1 to 4 carbon atoms, which process comprises the steps of (i) providing a liquid mixture containing cyclohexene, an alcohol $R_1OH$, hydrogen peroxide, and optionally a solvent;

(ii) converting the cyclohexene with the hydrogen peroxide and the alcohol $R_1OH$ in the mixture provided according to (i) in the presence of the zeolitic material or the molding, obtaining a mixture containing the compound of formula (I).

40. Use of a zeolitic material according to any of embodiments 20 to 36 or a molding according to embodiment 37 as an at least bifunctional catalyst, more preferably as an epoxidation and ring-opening catalyst or as an epoxidation and etherification catalyst or as a ring-opening and etherification catalyst, more preferably as a trifunctional catalyst, more preferably as an epoxidation and ring-opening and etherification catalyst.

41. The use of claim 40 in a process for preparing a compound of formula (I)

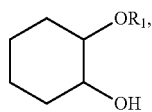

(I)

wherein $R_1$ is an alkyl residue having 1 to 4 carbon atoms, which process comprises the steps of (i) providing a liquid mixture containing cyclohexene, an alcohol $R_1OH$, hydrogen peroxide, and optionally a solvent;

(ii) converting the cyclohexene with the hydrogen peroxide and the alcohol $R_1OH$ in the mixture provided according to (i) in the presence of the zeolitic material or the molding, obtaining a mixture containing the compound of formula (I).

42. A process for preparing a compound of formula (I)

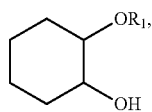

(I)

wherein $R_1$ is an alkyl residue having 1 to 4 carbon atoms, which process comprises the steps of (i) providing a liquid mixture containing cyclohexene, an alcohol $R_1OH$, hydrogen peroxide, and optionally a solvent;

(ii) converting the cyclohexene with the hydrogen peroxide and the alcohol $R_1OH$ in the mixture provided according to (i) in the presence of the zeolitic material according to any of embodiments 20 to 36 or a molding according to embodiment 37 as catalyst, obtaining a mixture containing the compound of formula (I).

The present invention is further illustrated by the following reference examples, examples, and comparative examples.

EXAMPLES

The following starting materials were employed:
Piperidine; from Sigma-Aldrich
Boric acid; from Bernd Kraft GmbH
Tetrabutyl orthotitanate; from Alfa Aesar
Fumed silica CAB-O-SIL® M7D and CAB-O-SIL® M5, from Cabot Corporation Reference Example 1

Determination of the $^{11}B$ Solid State NMR Spectra $^{11}B$ solid-state NMR experiments were performed using a Bruker Avance III spectrometer with 400 MHz $^1H$ Larmor frequency (Bruker Biospin, Germany). Samples were stored at 63% relative humidity at room temperature prior to packing in 4 mm $ZrO_2$ rotors. Measurements were performed under 10 kHz Magic Angle Spinning at room temperature. $^{11}B$ spectra were obtained using $^{11}B$ 15°-pulse excitation of 1 microsecond (μs) pulse width, a $^{11}B$ carrier frequency corresponding to −4 ppm in the referenced spectrum, and a scan recycle delay of 1 s. Signal was acquired for 10 ms, and accumulated with 5000 scans. Spectra were processed using Bruker Topspin with 30 Hz exponential line broadening, phasing, and baseline correction over the full spectrum width. Spectra were indirectly referenced to 1% TMS in $CDCl_3$ on the unified chemical shift scale, according to IUPAC (Pure Appl. Chem., Vol. 80, No. 1, pp. 59) using glycine with carbonyl peak at 175.67 ppm as a secondary standard.

Reference Example 2

Determination of the $^{29}Si$ Solid State NMR Spectra $^{29}Si$ solid-state NMR experiments were performed using a Bruker Avance III spectrometer with 400 MHz $^1H$ Larmor frequency (Bruker Biospin, Germany). Samples were stored at 63% relative humidity at room temperature prior to packing in 4 mm $ZrO_2$ rotors. Measurements were performed under 10 kHz Magic Angle Spinning at room temperature. $^{29}Si$ spectra were obtained using $^{29}Si$ 90°-pulse excitation of 5 microsecond (μs) pulse width, a $^{29}Si$ carrier frequency corresponding to −112 ppm in the referenced spectrum, and a scan recycle delay of 120 s. Signal was acquired for 20 milliseconds (ms) under 63 kHz high-power proton decoupling, and accumulated for at least 16 hours. Spectra were processed using Bruker Topspin with 50 Hz exponential line broadening, phasing, and baseline correction over the full spectrum width. Spectra were indirectly referenced to 1% TMS in $CDCl_3$ on the unified chemical shift scale, according to IUPAC (Pure Appl. Chem., Vol. 80, No. 1, pp. 59) using glycine with carbonyl peak at 175.67 ppm as a secondary standard.

Reference Example 3

Determination of the Water Uptake

Water adsorption/desorption isotherms were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5 K/min) and holding it for 6 h under a nitrogen flow. After the drying program, the temperature in the cell was decreased to 25° C. and kept isothermal during the measurement. The microbalance was calibrated, and the weight of the dried sample was balanced (maximum mass deviation 0.01 weight-%). Water uptake by the sample was measured as the increase in weight over that of the dry sample. First, as adsorption curve was measured by increasing the relative humidity (RH) (expressed as weight-% water in the atmosphere inside of the cell) to which the sample was exposed and measuring the water uptake by the sample as equilibrium. The RH was increased with a step of 10 weight-% from 5% to 85% and at each step the system controlled the RH and monitored the sample weight until reaching the equilibrium conditions after the sample was exposed from 85 weight-% to 5 weight-% with a step of 10% and the change in the weight of the sample (water uptake) was monitored and recorded.

Reference Example 4

Determination of the Infrared Spectra

The FT-IR (Fourier-Transformed-Infrared) measurements were performed on a Nicolet 6700 spectrometer. The powdered material was pressed into a self-supporting pellet without the use of any additives. The pellet was introduced into a high vacuum (HV) cell placed into the FT-IR instrument. Prior to the measurement the sample was pretreated in high vacuum ($10^{-5}$ mbar) for 3 h at 300° C. The spectra were collected after cooling the cell to 50° C. The spectra were recorded in the range of 4000 to 800 cm$^{-1}$ at a resolution of 2 cm$^{-1}$. The obtained spectra are represented in a plot having on the x axis the wavenumber (cm$^{-1}$) and on the y axis the absorbance (arbitrary units, a.u.). For the quantitative determination of the peak heights and the ratio between these peaks a baseline correction was carried out. Changes in the 3000-3900 cm$^{-1}$ region were analyzed and for comparing multiple samples, as reference the band at 1880±5 cm$^{-1}$ was taken.

Reference Example 5

Determination of the XRD Spectra

The XRD spectra were made with an D8 Advance Serie 2 from Bruker/AXS having a multiple sample changer.

Example 1

Preparation of a Zeolitic Material Having an MWW Framework Structure and Comprising Boron and Titanium According to the Invention To 841.82 g deionized water in a beaker glass, piperidine (200 g) was added and the resulting mixture was stirred for 5 min at room temperature. Boric acid (203.8 g) was added to the mixture and dissolved for 20 min, and then, a solution of tetrabutyl orthotitanate (17.75 g) dissolved in piperidine (99.24 g) was added under stirring at a stirring rate of 70 r.p.m., and the resulting mixture was stirred for 30 min at room temperature. Fumed silicon dioxide (Cab-O-Sil M7D, 147.9 g) was added to the mixture with stirring, and the resulting mixture was stirred for 90 min at room temperature. The mixture had a pH of 11.3.

The mixture was loaded into a 2.5 l autoclave, and slowly continuously heated to 170° C. within 10 hours, and then kept at this temperature for 160 h under stirring at a stirring speed of 100 r.p.m. The pressure during the reaction was within a range of 8.3 to 9 bar. The suspension obtained had a pH of 11.2. The suspension was filtered and the filter cake was washed with deionized water until the washings had a pH of less than 10. The filter cake was dried in a drying oven at 120° C. for 48 h, heated at a heating rate of 2 K/min to a temperature of 650° C., and calcined at 650° C. for 10 h in air atmosphere.

A colorless powder (101.3 g) was obtained. The powder had a boron content of 1.3 weight-%, calculated as elemental boron, a titanium content of 1.3 weight-%, calculated as elemental titanium, and a silicon content 40 weight-%, calculated as elemental titanium. The total organic carbon content (TOC) was 0.1 weight-%.

Figure 5:
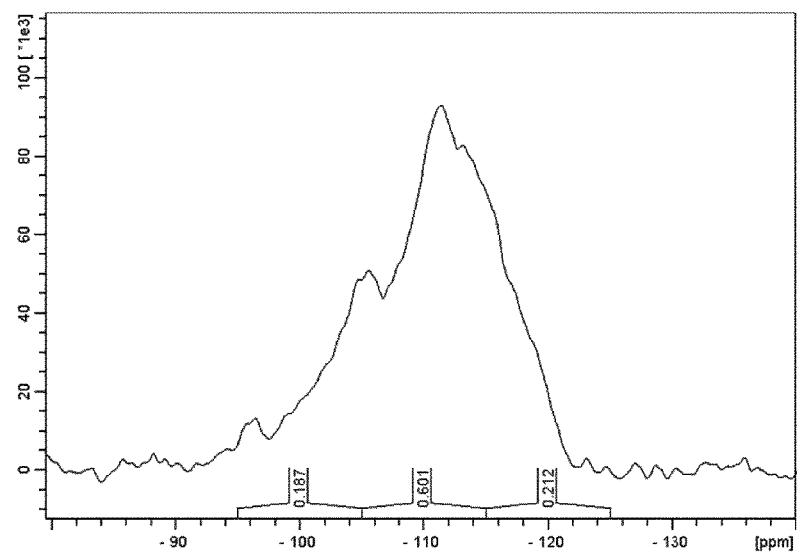
Figure 9:
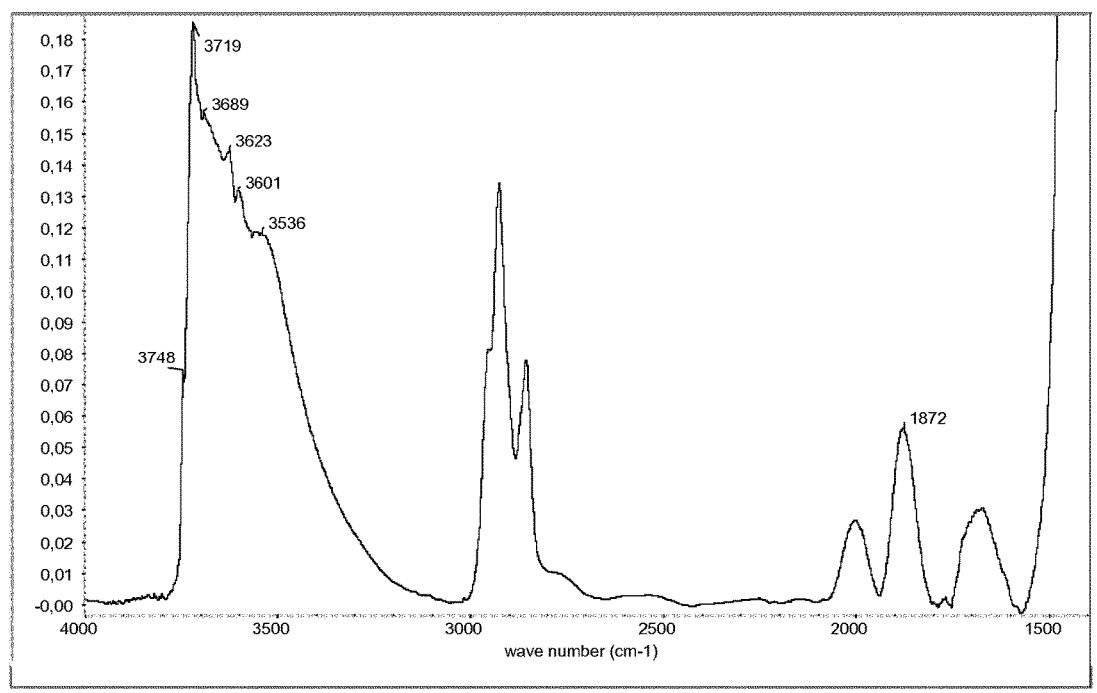

The $^{11}$B solid state NMR spectrum of the zeolitic material is shown in FIG. 1, the $^{29}$Si solid state NMR spectrum in FIG. 5. The FT-IR spectrum of the zeolitic material is shown in FIG. 9, the XRD spectrum in FIG. 10. Further, the XRD spectrum exhibits the following characteristics:

| Angle 2-Theta ° | d value Angstrom | Intensity Cps | Intensity % |
|---|---|---|---|
| 7.013 | 12.59532 | 274 | 20.3 |
| 7.238 | 12.20307 | 468 | 34.7 |
| 8.058 | 10.96352 | 326 | 24.2 |
| 10.137 | 8.71933 | 362 | 26.9 |
| 13.007 | 6.80071 | 134 | 10 |
| 14.278 | 6.19805 | 313 | 23.2 |
| 14.476 | 6.11373 | 408 | 30.3 |
| 14.924 | 5.93142 | 209 | 15.5 |
| 16.143 | 5.48597 | 249 | 18.5 |
| 18.048 | 4.91111 | 119 | 8.8 |
| 19.22 | 4.61418 | 192 | 14.3 |
| 20.448 | 4.33988 | 313 | 23.3 |
| 21.418 | 4.14544 | 239 | 17.8 |
| 21.857 | 4.06307 | 403 | 29.9 |
| 22.142 | 4.01139 | 424 | 31.5 |
| 22.687 | 3.91637 | 413 | 30.7 |
| 22.974 | 3.8681 | 747 | 55.5 |
| 23.97 | 3.70954 | 539 | 40 |
| 25.277 | 3.5206 | 446 | 33.1 |
| 26.321 | 3.38327 | 1346 | 100 |
| 27.289 | 3.26537 | 498 | 37 |
| 28.094 | 3.17361 | 511 | 37.9 |
| 28.947 | 3.08203 | 357 | 26.5 |
| 30.059 | 2.97051 | 210 | 15.6 |
| 32.004 | 2.79431 | 217 | 16.1 |
| 32.669 | 2.73889 | 229 | 17 |
| 33.757 | 2.65307 | 319 | 23.7 |
| 34.829 | 2.57383 | 233 | 17.3 |
| 36.837 | 2.43798 | 209 | 15.5 |
| 37.535 | 2.39427 | 197 | 14.6 |
| 38.316 | 2.34724 | 240 | 17.8 |
| 41.141 | 2.19233 | 204 | 15.2 |
| 41.982 | 2.15035 | 205 | 15.2 |
| 43.358 | 2.08522 | 213 | 15.8 |
| 45.169 | 2.00577 | 255 | 19 |
| 46.654 | 1.94533 | 266 | 19.8 |
| 46.968 | 1.93304 | 284 | 21.1 |
| 48.908 | 1.86079 | 255 | 19 |
| 49.494 | 1.84015 | 259 | 19.2 |
| 49.992 | 1.82295 | 232 | 17.2 |
| 51.38 | 1.77694 | 246 | 18.3 |
| 52.019 | 1.75659 | 255 | 18.9 |
| 53.699 | 1.70552 | 240 | 17.8 |
| 54.686 | 1.67707 | 230 | 17.1 |
| 57.016 | 1.61393 | 233 | 17.3 |
| 57.764 | 1.5948 | 225 | 16.7 |
| 58.87 | 1.56745 | 240 | 17.8 |
| 60.68 | 1.52495 | 248 | 18.4 |
| 62.067 | 1.49415 | 261 | 19.4 |
| 63.043 | 1.47336 | 262 | 19.5 |
| 65.449 | 1.42489 | 286 | 21.2 |
| 66.425 | 1.40631 | 348 | 25.9 |

Comparative Example 1

Preparation of a Zeolitic Material Having an MWW Framework Structure and Comprising Boron and Titanium, Based on Wu et al The preparation was carried out analogously to P. Wu et al. However, in order to allow for a comparison between the respectively obtained material with the material according to the present invention, the process according to Wu et al. was modified in that the acid treatment step was not carried out. This is the only possibility that with respect to the finally obtained materials, characteristics can be compared on a reasonable basis since only if the acid treatment step and, thus, the step of removing the boron is not carried out, the resulting calcined material of prepared analogously to Wu et al. still contains boron.

To 841.22 g deionized water in a beaker, piperidine (299.24 g) was added and the resulting mixture was stirred for 5 min at room temperature. The aqueous piperidine solution was split into two equal parts. To the first part of the aqueous piperidine solution, boric acid (203.80 g) was added under stirring at a stirring rate of 70 r.p.m., and the resulting mixture was stirred for 30 min at room temperature, and then, fumed silicon dioxide (Cab-O-Sil® M7D, 73.95 g) was added to the mixture with stirring, and the resulting mixture was stirred for 1 h at room temperature. To the second part of the aqueous piperidine solution, tetrabutyl orthotitanate (17.75 g) was added under stirring, and the resulting mixture was stirred for 30 min at room temperature and then, fumed silicon dioxide (Cab-O-Sil® M7D, 73.95 g) was added to the mixture with stirring, and the resulting mixture was stirred for 1 h at room temperature. The mixtures prepared from the first and the second part of the aqueous piperidine solution were combined and stirred at room temperature for 1.5 h at room temperature. The resulting mixture had a pH of 11.1.

The mixture was loaded into a 2.5 l autoclave, and kept at a temperature of 130° C. for 24 h, then at 150° C. for 24 h and then at 170° C. for 120 h, while it was stirred at a stirring rate of 100 r.p.m. The pressure during the reaction was within a range of 8 to 9 bar. The suspension obtained had a pH of about 11.1. The suspension was filtered and the filter cake was washed with deionized water until the washings had a pH of less than 10. The filter cake was dried in a drying oven at 50° C. for 24 h and subsequently, the dried filter cake was heated at a heating rate of 2 K/min to a temperature of 530° C., and calcined at 530° C. for 10 h in air atmosphere. A colorless powder (111.5 g) was obtained. The powder had a boron content of 1.3 weight-%, calculated as elemental boron, a titanium content of 1.6 weight-%, calculated as elemental titanium, and a silicon content 42.0 weight-%, calculated as elemental titanium. The total organic carbon content (TOC) was less than 0.1 weight-%.

Figure 2:
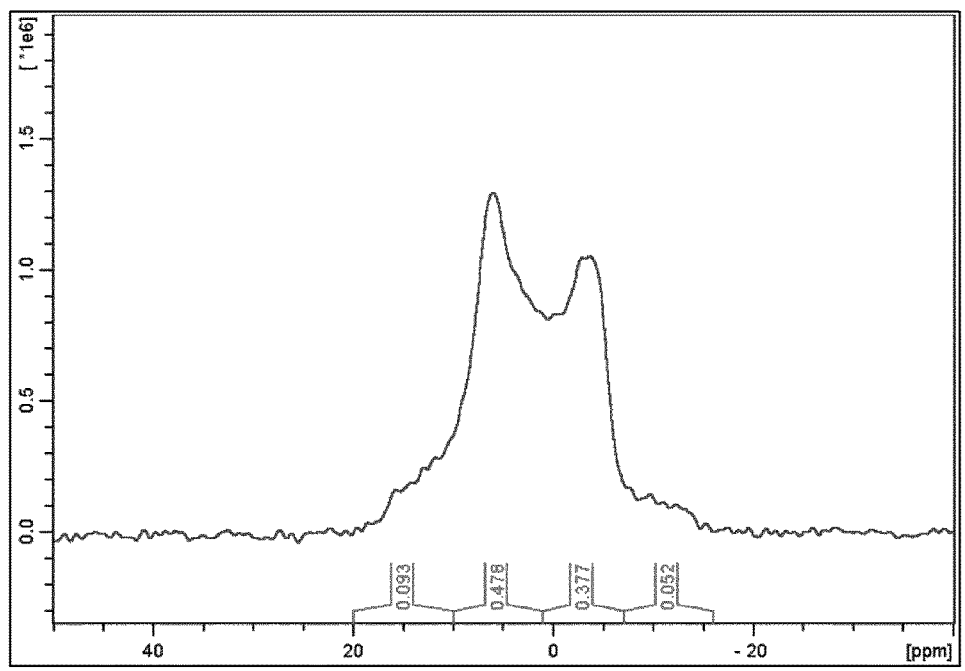
Figure 6:
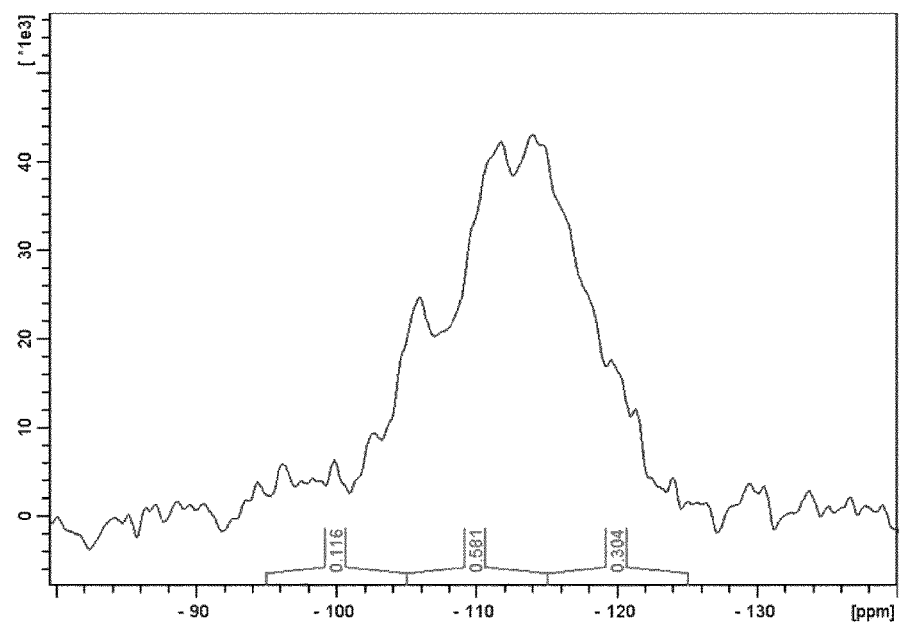

The $^{11}$B solid state NMR spectrum of the zeolitic material is shown in FIG. 2, the $^{29}$Si solid state NMR spectrum in FIG. 6. Further, the XRD spectrum exhibits the following characteristics:

| Angle 2-Theta ° | d value Angstrom | Intensity Cps | Intensity % |
|---|---|---|---|
| 7.013 | 12.59532 | 274 | 20.3 |
| 7.238 | 12.20307 | 468 | 34.7 |
| 8.058 | 10.96352 | 326 | 24.2 |
| 10.137 | 8.71933 | 362 | 26.9 |
| 13.007 | 6.80071 | 134 | 10 |
| 14.278 | 6.19805 | 313 | 23.2 |
| 14.476 | 6.11373 | 408 | 30.3 |
| 14.924 | 5.93142 | 209 | 15.5 |
| 16.143 | 5.48597 | 249 | 18.5 |
| 18.048 | 4.91111 | 119 | 8.8 |
| 19.22 | 4.61418 | 192 | 14.3 |
| 20.448 | 4.33988 | 313 | 23.3 |
| 21.418 | 4.14544 | 239 | 17.8 |
| 21.857 | 4.06307 | 403 | 29.9 |
| 22.142 | 4.01139 | 424 | 31.5 |
| 22.687 | 3.91637 | 413 | 30.7 |
| 22.974 | 3.8681 | 747 | 55.5 |
| 23.97 | 3.70954 | 539 | 40 |
| 25.277 | 3.5206 | 446 | 33.1 |
| 26.321 | 3.38327 | 1346 | 100 |
| 27.289 | 3.26537 | 498 | 37 |
| 28.094 | 3.17361 | 511 | 37.9 |
| 28.947 | 3.08203 | 357 | 26.5 |
| 30.059 | 2.97051 | 210 | 15.6 |
| 32.004 | 2.79431 | 217 | 16.1 |
| 32.669 | 2.73889 | 229 | 17 |
| 33.757 | 2.65307 | 319 | 23.7 |
| 34.829 | 2.57383 | 233 | 17.3 |
| 36.837 | 2.43798 | 209 | 15.5 |
| 37.535 | 2.39427 | 197 | 14.6 |
| 38.316 | 2.34724 | 240 | 17.8 |
| 41.141 | 2.19233 | 204 | 15.2 |
| 41.982 | 2.15035 | 205 | 15.2 |
| 43.358 | 2.08522 | 213 | 15.8 |
| 45.169 | 2.00577 | 255 | 19 |
| 46.654 | 1.94533 | 266 | 19.8 |
| 46.968 | 1.93304 | 284 | 21.1 |
| 48.908 | 1.86079 | 255 | 19 |
| 49.494 | 1.84015 | 259 | 19.2 |
| 49.992 | 1.82295 | 232 | 17.2 |
| 51.38 | 1.77694 | 246 | 18.3 |
| 52.019 | 1.75659 | 255 | 18.9 |
| 53.699 | 1.70552 | 240 | 17.8 |
| 54.686 | 1.67707 | 230 | 17.1 |
| 57.016 | 1.61393 | 233 | 17.3 |
| 57.764 | 1.5948 | 225 | 16.7 |
| 58.87 | 1.56745 | 240 | 17.8 |
| 60.68 | 1.52495 | 248 | 18.4 |
| 62.067 | 1.49415 | 261 | 19.4 |
| 63.043 | 1.47336 | 262 | 19.5 |
| 65.449 | 1.42489 | 286 | 21.2 |
| 66.425 | 1.40631 | 348 | 25.9 |

Comparative Example 2

Preparation of a Zeolitic Material Having an MWW Framework Structure and Comprising Boron and Titanium, Based on US 2011190517 A1

The preparation was carried out analogously to the recipe of US 2011190517 A1, in example 1, catalyst 1A. However, in order to allow for a comparison between the respectively obtained material with the material according to the present invention, the process according to Wu et al. was modified in that the acid treatment step was not carried out. This is the only possibility that with respect to the finally obtained materials, characteristics can be compared on a reasonable basis since only if the acid treatment step and, thus, the step of removing the boron is not carried out, the resulting calcined material of prepared analogously to US 2011190517 A1 still contains boron.

To 835.83 g deionized water in a beaker glass, piperidine (324 g) was added and the resulting mixture was stirred for 5 min at room temperature. The aqueous piperidine solution was split into two equal portions. To the first portion of the aqueous piperidine solution, boric acid (195.36 g) was added under stirring, and the resulting mixture was stirred at a stirring rate of 70 r.p.m. for 30 min at room temperature, and then, fumed silicon dioxide (Cab-O-Sil® M5, 73.95 g) was added to the mixture with stirring, and the resulting mixture was stirred for 1.5 h at room temperature. To the second portion of the aqueous piperidine solution, tetrabutyl orthotitanate (21.09 g) was added under stirring, and the resulting mixture was stirred for 30 min at room temperature and then, fumed silicon dioxide (Cab-O-Sil M5®, 73.95 g) was added to the mixture with stirring, and the resulting mixture was stirred for 1.5 h at room temperature. The mixtures prepared from the first and the second part of the aqueous piperidine solution were combined and stirred at room temperature for 1.5 h. The resulting mixture had a pH of 11.3.

The mixture was loaded into a 2.5 l autoclave, and kept at a temperature of 130° C. for 24 h, then at 150° C. for 24 h and then at 170° C. for 240 h, while it was stirred at a stirring rate of 100 r.p.m. The pressure during the reaction was within a range of 8 to 9 bar. The suspension obtained had a pH of 11.4. The suspension was filtered and the filter cake was washed with deionized water until the washings had a pH of less than 10. The filter cake was dried in a drying oven at 50° C. for 24 h and subsequently, the dried filter cake was heated at a heating rate of 2 K/min to a temperature of 530° C., and calcined at 530° C. for 10 h in air atmosphere. A colorless powder (133 g) was obtained. The powder had a boron content of 1.6 weight-%, calculated as elemental boron, a titanium content of 1.4 weight-%, calculated as elemental titanium, and a silicon content 44 weight-%, calculated as elemental titanium. The total organic carbon content (TOC) was less than 0.1 weight-%.

Figure 3:
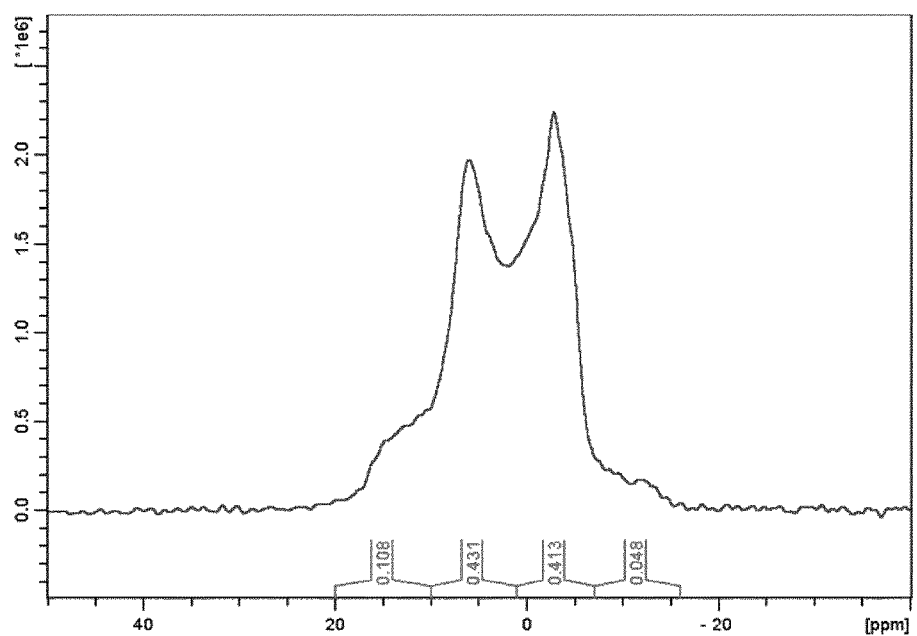
Figure 7:
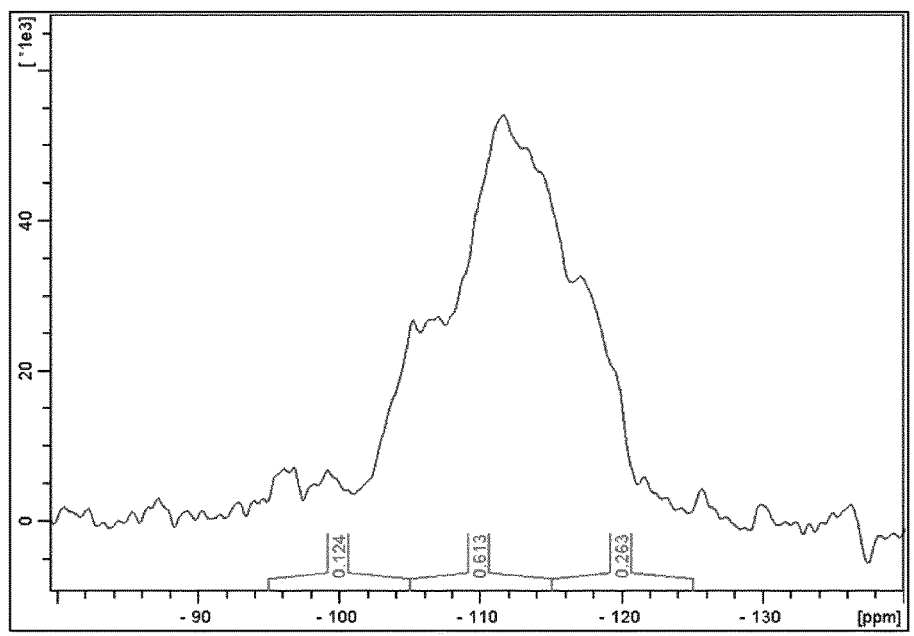

The $^{11}$B solid state NMR spectrum of the zeolitic material is shown in FIG. 3, the $^{29}$Si solid state NMR spectrum in FIG. 7. Further, the XRD spectrum exhibits the following characteristics:

| Angle 2-Theta ° | d value Angstrom | Intensity Cps | Intensity % |
|---|---|---|---|
| 7.013 | 12.59532 | 274 | 20.3 |
| 7.238 | 12.20307 | 468 | 34.7 |
| 8.058 | 10.96352 | 326 | 24.2 |
| 10.137 | 8.71933 | 362 | 26.9 |
| 13.007 | 6.80071 | 134 | 10 |
| 14.278 | 6.19805 | 313 | 23.2 |
| 14.476 | 6.11373 | 408 | 30.3 |
| 14.924 | 5.93142 | 209 | 15.5 |
| 16.143 | 5.48597 | 249 | 18.5 |
| 18.048 | 4.91111 | 119 | 8.8 |
| 19.22 | 4.61418 | 192 | 14.3 |
| 20.448 | 4.33988 | 313 | 23.3 |
| 21.418 | 4.14544 | 239 | 17.8 |
| 21.857 | 4.06307 | 403 | 29.9 |
| 22.142 | 4.01139 | 424 | 31.5 |
| 22.687 | 3.91637 | 413 | 30.7 |
| 22.974 | 3.8681 | 747 | 55.5 |
| 23.97 | 3.70954 | 539 | 40 |
| 25.277 | 3.5206 | 446 | 33.1 |
| 26.321 | 3.38327 | 1346 | 100 |
| 27.289 | 3.26537 | 498 | 37 |
| 28.094 | 3.17361 | 511 | 37.9 |
| 28.947 | 3.08203 | 357 | 26.5 |
| 30.059 | 2.97051 | 210 | 15.6 |
| 32.004 | 2.79431 | 217 | 16.1 |
| 32.669 | 2.73889 | 229 | 17 |
| 33.757 | 2.65307 | 319 | 23.7 |
| 34.829 | 2.57383 | 233 | 17.3 |
| 36.837 | 2.43798 | 209 | 15.5 |
| 37.535 | 2.39427 | 197 | 14.6 |
| 38.316 | 2.34724 | 240 | 17.8 |
| 41.141 | 2.19233 | 204 | 15.2 |
| 41.982 | 2.15035 | 205 | 15.2 |
| 43.358 | 2.08522 | 213 | 15.8 |
| 45.169 | 2.00577 | 255 | 19 |
| 46.654 | 1.94533 | 266 | 19.8 |
| 46.968 | 1.93304 | 284 | 21.1 |
| 48.908 | 1.86079 | 255 | 19 |
| 49.494 | 1.84015 | 259 | 19.2 |
| 49.992 | 1.82295 | 232 | 17.2 |
| 51.38 | 1.77694 | 246 | 18.3 |
| 52.019 | 1.75659 | 255 | 18.9 |
| 53.699 | 1.70552 | 240 | 17.8 |
| 54.686 | 1.67707 | 230 | 17.1 |
| 57.016 | 1.61393 | 233 | 17.3 |
| 57.764 | 1.5948 | 225 | 16.7 |
| 58.87 | 1.56745 | 240 | 17.8 |
| 60.68 | 1.52495 | 248 | 18.4 |
| 62.067 | 1.49415 | 261 | 19.4 |
| 63.043 | 1.47336 | 262 | 19.5 |
| 65.449 | 1.42489 | 286 | 21.2 |
| 66.425 | 1.40631 | 348 | 25.9 |

Comparative Example 3

Preparation of a Zeolitic Material Having an MWW Framework Structure and Comprising Boron and Titanium, Based on WO 2012/046881 A1

The preparation was carried out analogously to the recipe of WO 2012/046881 A1. However, in order to allow for a comparison between the respectively obtained material with the material according to the present invention, the process according to Wu et al. was modified in that the acid treatment step was not carried out. This is the only possibility that with respect to the finally obtained materials, characteristics can be compared on a reasonable basis since only if the acid treatment step and, thus, the step of removing the boron is not carried out, the resulting calcined material of prepared analogously to WO 2012/046881 A1 still contains boron.

In a vessel, 323.64 g piperidine were dissolved in 864.32 g de-ionized (DI) water. Subsequently, tetrabutylorthotitanate (40.32 g) was added under stirring, and subsequently, boric acid (203.4 g) was added under further stirring. Finally, fumed silicon dioxide (Cab-O-Sil M5®, 40.32 g) was added to the mixture. The thus obtained mixture was stirred for 1.5 h at room temperature.

The resulting mixture was transferred into an autoclave and heated to 160° C. within 8 h. The thus heated mixture was kept at 160° C. for 120 h. The resulting suspension had a pH of 11.1. The zeolitic material was separated by filtration (suction filter), washed with DI water until the pH of the filtrate was below 10. The filter cake was dried in a drying oven at 50° C. for 24 h and subsequently, the dried filter cake was heated at a heating rate of 2 K/min to a temperature of 530° C., and calcined at 530° C. for 10 h in air atmosphere. A colorless powder (170 g) was obtained. The powder had a boron content of 2.0 weight-%, calculated as elemental boron, a titanium content of 2.8 weight-%, calculated as elemental titanium, and a silicon content 42 weight-%, calculated as elemental titanium. The total organic carbon content (TOC) was 0.1 weight-%.

Figure 4:
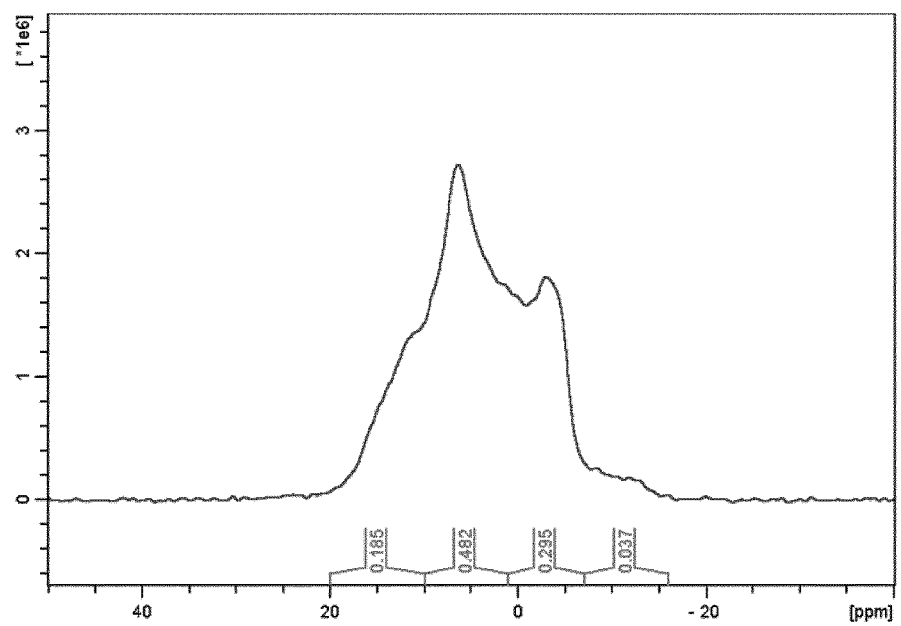
Figure 8:
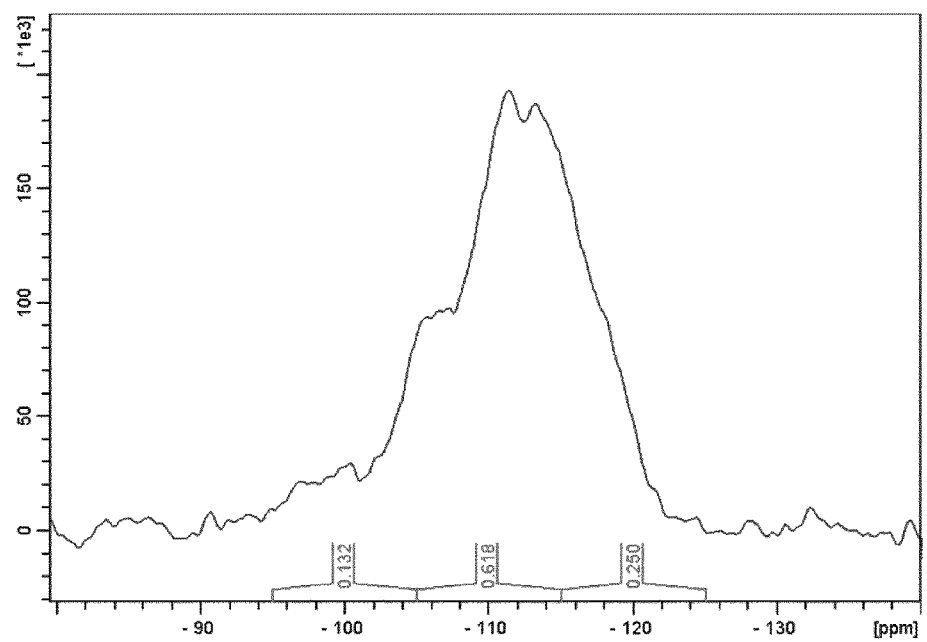

The $^{11}$B solid state NMR spectrum of the zeolitic material is shown in FIG. 4, the $^{29}$Si solid state NMR spectrum in FIG. 8. Further, the XRD spectrum exhibits the following characteristics:

| Angle 2-Theta ° | d value Angstrom | Intensity Cps | Intensity % |
|---|---|---|---|
| 7.013 | 12.59532 | 274 | 20.3 |
| 7.238 | 12.20307 | 468 | 34.7 |
| 8.058 | 10.96352 | 326 | 24.2 |
| 10.137 | 8.71933 | 362 | 26.9 |
| 13.007 | 6.80071 | 134 | 10 |
| 14.278 | 6.19805 | 313 | 23.2 |
| 14.476 | 6.11373 | 408 | 30.3 |
| 14.924 | 5.93142 | 209 | 15.5 |
| 16.143 | 5.48597 | 249 | 18.5 |
| 18.048 | 4.91111 | 119 | 8.8 |
| 19.22 | 4.61418 | 192 | 14.3 |
| 20.448 | 4.33988 | 313 | 23.3 |
| 21.418 | 4.14544 | 239 | 17.8 |
| 21.857 | 4.06307 | 403 | 29.9 |
| 22.142 | 4.01139 | 424 | 31.5 |
| 22.687 | 3.91637 | 413 | 30.7 |
| 22.974 | 3.8681 | 747 | 55.5 |
| 23.97 | 3.70954 | 539 | 40 |
| 25.277 | 3.5206 | 446 | 33.1 |
| 26.321 | 3.38327 | 1346 | 100 |
| 27.289 | 3.26537 | 498 | 37 |
| 28.094 | 3.17361 | 511 | 37.9 |
| 28.947 | 3.08203 | 357 | 26.5 |
| 30.059 | 2.97051 | 210 | 15.6 |
| 32.004 | 2.79431 | 217 | 16.1 |
| 32.669 | 2.73889 | 229 | 17 |
| 33.757 | 2.65307 | 319 | 23.7 |
| 34.829 | 2.57383 | 233 | 17.3 |
| 36.837 | 2.43798 | 209 | 15.5 |
| 37.535 | 2.39427 | 197 | 14.6 |
| 38.316 | 2.34724 | 240 | 17.8 |
| 41.141 | 2.19233 | 204 | 15.2 |
| 41.982 | 2.15035 | 205 | 15.2 |
| 43.358 | 2.08522 | 213 | 15.8 |
| 45.169 | 2.00577 | 255 | 19 |
| 46.654 | 1.94533 | 266 | 19.8 |
| 46.968 | 1.93304 | 284 | 21.1 |
| 48.908 | 1.86079 | 255 | 19 |
| 49.494 | 1.84015 | 259 | 19.2 |
| 49.992 | 1.82295 | 232 | 17.2 |
| 51.38 | 1.77694 | 246 | 18.3 |
| 52.019 | 1.75659 | 255 | 18.9 |
| 53.699 | 1.70552 | 240 | 17.8 |
| 54.686 | 1.67707 | 230 | 17.1 |
| 57.016 | 1.61393 | 233 | 17.3 |
| 57.764 | 1.5948 | 225 | 16.7 |
| 58.87 | 1.56745 | 240 | 17.8 |
| 60.68 | 1.52495 | 248 | 18.4 |
| 62.067 | 1.49415 | 261 | 19.4 |
| 63.043 | 1.47336 | 262 | 19.5 |
| 65.449 | 1.42489 | 286 | 21.2 |
| 66.425 | 1.40631 | 348 | 25.9 |

Example 2

Comparison of the $^{11}$B and $^{29}$Si NMR Spectra of the Zeolitic Materials

A comparison of the $^{11}$B solid state NMR spectra of the zeolitic materials according to Example 1 and Comparative Examples 1, 2 and 3 shows that the zeolitic material according to the invention has the highest ratio of the integral of the range of the third signal relative to the integral of the range of the second signal, as shown in Table 1 below:

TABLE 1

Comparison of the integrals of the signals

| Catalyst obtained from | integral signal 1 | integral signal 2 | integral signal 3 | integral signal 4 | ratio integral 3/ integral 2 |
|---|---|---|---|---|---|
| Example 1 | 0.1755 | 0.3685 | 0.4209 | 0.0352 | 1.14 |
| Comp. Example 1 | 0.0928 | 0.4783 | 0.2772 | 0.0517 | 0.79 |
| Comp. Example 2 | 0.1079 | 0.3685 | 0.4209 | 0.0352 | 0.96 |
| Comp. Example 3 | 0.1852 | 0.4825 | 0.2951 | 0.0371 | 0.61 |

A comparison of the $^{29}$Si solid state NMR spectra of the zeolitic materials according to Example 1 and Comparative Examples 1, 2 and 3 shows that the zeolitic material according to the invention has the highest ratio of the integral of the range of the first signal relative to the integral of the range of the third signal, as shown in Table 2 below:

TABLE 2

Comparison of the integrals of the signals

| Catalyst obtained from | integral signal 1 | integral signal 2 | integral signal 3 | ratio integral 1/ integral 3 |
|---|---|---|---|---|
| Example 1 | 0.187 | 0.6005 | 0.2125 | 0.88 |
| Comp. Example 1 | 0.1157 | 0.5806 | 0.3037 | 0.38 |
| Comp. Example 2 | 0.1241 | 0.6133 | 0.2626 | 0.47 |
| Comp. Example 3 | 0.1316 | 0.6181 | 0.2503 | 0.53 |

Example 3

Test of the Zeolitic Materials as a Catalytic Material

The zeolitic materials obtained in Example 1, Comparative Example 1 and Comparative Example 2 were employed as catalysts in an oxidation reaction, specifically in the reaction of cyclohexene with hydrogen peroxide to give 2-methoxycyclohexanol.

In a reaction vessel, 1 g of the respective zeolitic material was admixed with 3.92 g of cyclohexene in 20 ml methanol. To the resulting mixture, 1 g of a 50 weight-% aqueous hydrogen peroxide solution were added. The mixture was heated for 4 h at 65° C. under stirring.

After removal of the catalyst by means of filtration, and after weighing the thus obtained filtrate, a sample was taken from the filtrate. From this sample, the content of hydrogen peroxide was measured by means of cerimetry, in order to determine the hydrogen peroxide conversion rate.

To the remaining filtrate, sodium sulfite was added in order to decompose the remaining hydrogen peroxide, and a sample was taken from this filtrate for gas chromatography analysis to determine the molar amounts of the compounds of formulae (I) to (V) formed according to the reaction scheme below. From the molar amounts, the selectivity was calculated as the molar amount of the 2-methoxycyclohexanol (compound of formula (I)) relative to the total molar amount of all compounds of formulae (I) to (V). The abbreviation "B-Ti-MWW" stand for the respectively employed zeolitic material.

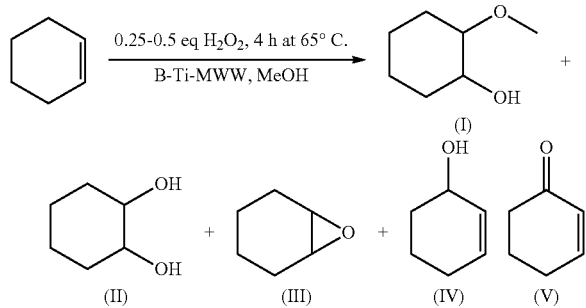

The experimental results are shown in Table 3 below.

TABLE 3

Experimental results of Example 1 and Comparative Examples 1, 2, and 3

| Catalyst obtained from | $H_2O_2$ conversion rate/% | Selectivity/% |
|---|---|---|
| Example 1 | 67 | 84 |
| Comparative Example 1 | 27 | 79 |
| Comparative Example 2 | 31 | 71 |
| Comparative Example 3 | 45 | 73 |

These results clearly show that the zeolitic material prepared according to Example 1 provides for a significantly improved selectivity and, at the same time, a higher conversion rate compared with the zeolitic material prepared according to Comparative Examples 1, 2, and 3.

SUMMARY OF THE EXAMPLES

As shown hereinabove, although the process of the prior art had to be modified according to a certain aspect of the concept of the present invention and no acid treatment step was carried according to Comparative Examples 1 and 2 to allow for preparing a calcined zeolitic material comprising titanium as well as boron, and not only titanium, the materials according to the prior art significantly differ from the inventive material; in particular, reference is made to the comparison of the zeolitic materials with respect to their $^{11}B$ and $^{29}Si$ solid state NMR spectra in Example 2 above and, further, to the test of the zeolitic materials as catalytic materials according to Example 3 above.

SHORT DESCRIPTION OF THE FIGURES

FIG. 1 shows the $^{11}B$ solid-state NMR spectrum of the zeolitic material according to Example 1, determined according to Reference Example 1. On the x axis, the $^{11}B$ chemical shift (in ppm) is shown, on the y axis, the intensity ($*10^6$). Tick mark labels on the x axis are, from left to right, at 40, 20, 0, −20. Tick mark labels on the y axis are, from bottom to top, at 0, 1, 2, 3, 4.

FIG. 2 shows the $^{11}B$ solid-state NMR spectrum of the zeolitic material according to Comparative Example 1, determined according to Reference Example 1. On the x axis, the $^{11}B$ chemical shift (in ppm) is shown, on the y axis, the intensity ($*10^6$). Tick mark labels on the x axis are, from left to right, at 40, 20, 0, −20. Tick mark labels on the y axis are, from bottom to top, at 0.0, 0.5, 1.0, 1.5.

FIG. 3 shows the $^{11}B$ solid-state NMR spectrum of the zeolitic material according to Comparative Example 2, determined according to Reference Example 1. On the x axis, the $^{11}B$ chemical shift (in ppm) is shown, on the y axis, the intensity ($*10^6$). Tick mark labels on the x axis are, from left to right, at 40, 20, 0, −20. Tick mark labels on the y axis are, from bottom to top, at 0.0, 0.5, 1.0, 1.5, 2.0.

FIG. 4 shows the $^{11}B$ solid-state NMR spectrum of the zeolitic material according to Comparative Example 3, determined according to Reference Example 1. On the x axis, the $^{11}B$ chemical shift (in ppm) is shown, on the y axis, the intensity ($*10^6$). Tick mark labels on the x axis are, from left to right, at 40, 20, 0, −20. Tick mark labels on the y axis are, from bottom to top, at 0, 1, 2, 3.

FIG. 5 shows the $^{29}Si$ solid-state NMR spectrum of the zeolitic material according to Example 1, determined according to Reference Example 2. On the x axis, the $^{29}Si$ chemical shift (in ppm) is shown, on the y axis, the intensity ($*10^3$). Tick mark labels on the x axis are, from left to right, at −90, −100, −110, −120, −130. Tick mark labels on the y axis are, from bottom to top, at 0, 20, 40, 60, 80, 100.

FIG. 6 shows the $^{29}Si$ solid-state NMR spectrum of the zeolitic material according to Comparative Example 1, determined according to Reference Example 2. On the x axis, the $^{29}Si$ chemical shift (in ppm) is shown, on the y axis, the intensity ($*10^3$). Tick mark labels on the x axis are, from left to right, at −90, −100, −110, −120, −130. Tick mark labels on the y axis are, from bottom to top, at 0, 10, 20, 30, 40.

FIG. 7 shows the $^{29}Si$ solid-state NMR spectrum of the zeolitic material according to Comparative Example 2, determined according to Reference Example 2. On the x axis, the $^{29}Si$ chemical shift (in ppm) is shown, on the y axis, the intensity ($*10^3$). Tick mark labels on the x axis are, from left to right, at −90, −100, −110, −120, −130. Tick mark labels on the y axis are, from bottom to top, at 0, 20, 40.

FIG. 8 shows the $^{29}Si$ solid-state NMR spectrum of the zeolitic material according to Comparative Example 3, determined according to Reference Example 2. On the x axis, the $^{29}Si$ chemical shift (in ppm) is shown, on the y axis, the intensity ($*10^3$). Tick mark labels on the x axis are, from left to right, at −90, −100, −110, −120, −130. Tick mark labels on the y axis are, from bottom to top, at 0, 50, 100, 150.

FIG. 9 shows the FT-IR spectrum of the zeolitic material according to Example 1, determined according to Reference Example 4. On the x axis, the wavenumber (in $cm^{-1}$) is shown, on the y axis, the extinction. Tick mark labels on the x axis are, from left to right, at 4000, 3500, 3000, 2500, 2000, 1500. Tick mark labels on the y axis are, from bottom to top, at −0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18. The wave numbers in $cm^{-1}$ given at the individual peaks are, from left to right, 3748, 3719, 3689, 3623, 3601, 3536, 1872.

Figure 10:
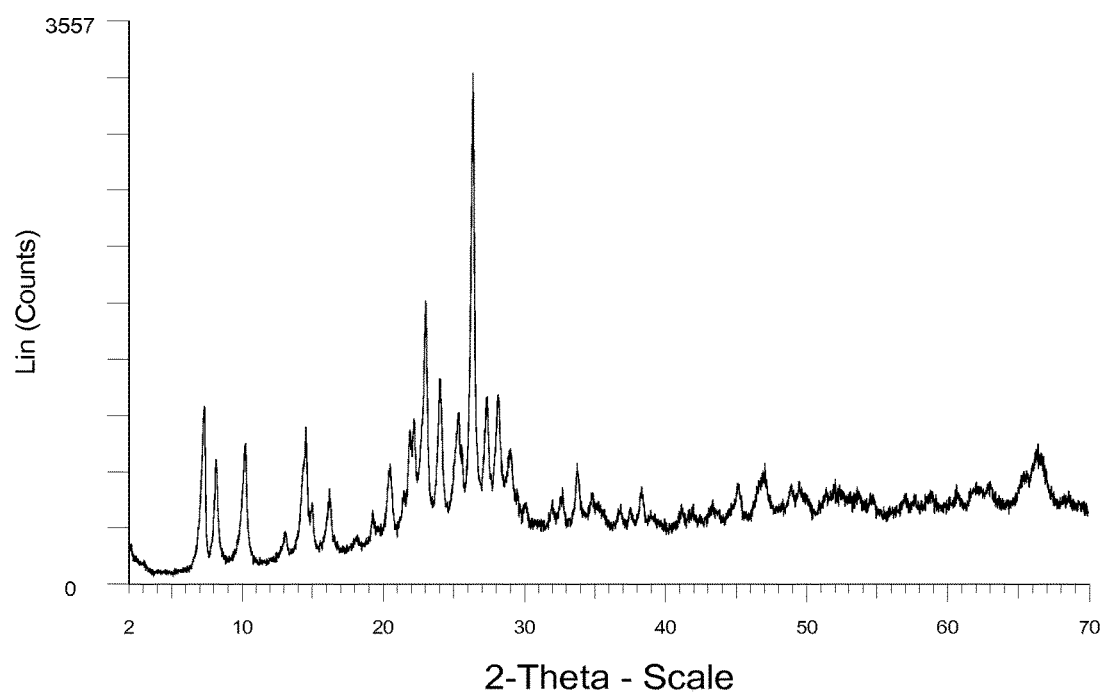

FIG. 10 shows the X-ray diffraction pattern (copper K alpha radiation) of the zeolitic material according to Example 1, determined according to Reference Example 5. On the x axis, the degree values (2 Theta) are shown, on the y axis, the intensity (Lin (Counts)). Tick mark labels on the x axis are, from left to right, at 2, 10, 20, 30, 40, 50, 60, and 70. Tick mark labels on the y axis are, from bottom to top, at 0 and 3557.

CITED LITERATURE

P. Wu et al., "A novel titanosilicate with MWW structure. I. Hydrothermal synthesis, elimination of extraframework titanium, and characterizations", J. Phys. Chem. B., 2001, vol. 105, no. 15, pp 2897 to 2905

US 20110190517 A1
WO 2012/046881 A1
WO 2010/067855 A1

The invention claimed is:

1. A process for preparing a zeolitic material having an MWW framework structure and comprising boron and titanium, the process comprising
(i) providing an aqueous synthesis mixture comprising a silica source, a boron source, a titanium source, and an MWW templating agent, at a temperature of at most 50° C.;
(ii) heating the aqueous synthesis mixture from the temperature of at most 50° C. to a temperature in the range of from 160 to 190° C. within a time period of at most 24 h;
(iii) subjecting the aqueous synthesis mixture obtained in (ii) to hydrothermal synthesis conditions under autogenous pressure in a closed system at a temperature in the range of from 160 to 190° C., thereby obtaining, in a mother liquor, a precursor of the zeolitic material having an MWW framework structure and comprising boron and titanium;
(iv) separating the precursor of the zeolitic material having an MWW framework structure and comprising boron and titanium from the mother liquor; and
(v) calcining the separated precursor of the zeolitic material having an MWW framework structure and comprising boron and titanium obtained in (iv), thereby obtaining the zeolitic material having an MWW framework structure and comprising boron and titanium;
wherein neither prior to nor during (iv), the precursor of the zeolitic material having an MWW framework structure and comprising boron and titanium is treated with an aqueous solution having a pH of at most 6, as determined by a pH-sensitive glass electrode.

2. The process of claim 1, wherein the aqueous synthesis mixture provided in (i) is prepared by adding the silica source to an aqueous mixture comprising the boron source, the titanium source and the MWW templating agent.

3. The process of claim 2, wherein the aqueous mixture comprising the boron source, the titanium source and the MWW templating agent is prepared by adding a mixture comprising a portion of the MWW templating agent and the titanium source to an aqueous mixture comprising a portion of the MWW templating agent and the boron source.

4. The process of claim 2, wherein after adding the silica source, the aqueous synthesis mixture is stirred at the temperature of at most 50° C. for a time period in the range of from 45 to 180 min.

5. The process of claim 1, wherein in (i),
the silica source is selected from the group consisting of fumed silica, colloidal silica, a silicon alkoxide, and a mixture of two or more thereof;
the boron source is selected from the group consisting of boric acid, a borate, boron oxide, and a mixture of two or more thereof;
the titanium source is selected from the group consisting of a titanium alkoxide, a titanium halide, a titanium salt, titanium dioxide and a mixture of two or more thereof; and
the MWW templating agent is selected from the group consisting of piperidine, hexamethylene imine, N,N,N,N',N',N'-hexamethyl-1,5-pentanediammonium ion, 1,4-bis(N-methylpyrrolidinium) butane, octyltrimethylammonium hydroxide, heptyltrimethyl-ammonium hydroxide, hexyltrimethylammonium hydroxide, and a mixture of two or more thereof.

6. The process of claim 1, wherein the aqueous synthesis mixture provided in (i) contains
the boron source, calculated as elemental boron, relative to the silicon source, calculated as elemental silicon, in a molar ratio in the range of from 0.18 : 1 to 5.2 : 1;
the titanium source, calculated as elemental titanium, relative to the silicon source, calculated as elemental silicon, in a molar ratio in the range of from 0.005 : 1 to 0.15 : 1;
the MWW templating agent relative to the silicon source, calculated as elemental silicon, in a molar ratio in the range of from 0.4 : 1 to 4.2 : 1; and
water relative to the silicon source, calculated as elemental silicon, in a molar ratio in the range of from 1 : 1 to 30 : 1.

7. The process of claim 1, wherein the aqueous synthesis mixture provided in (i) has a pH in the range of from 10 to 13 as determined by a pH-sensitive glass electrode.

8. The process of claim 1, wherein in (ii), the heating is carried out for the time period in the range of from 2 to 18 h.

9. The process of claim 1, wherein in (ii), the heating is carried out continuously from the temperature of at most 50° C. to a temperature in the range of from 160 to 190° C.

10. The process of claim 1, wherein in (iii), the synthesis mixture is subjected to the hydrothermal synthesis conditions at autogenous pressure for a time period in the range of from 80 to 200 h.

11. The process of claim 1, wherein the separating (iv) comprises
(iv.1) washing the precursor of the zeolitic material having an MWW framework structure and comprising boron and titanium to obtain a washed precursor of the zeolitic material having an MWW framework structure and comprising boron and titanium; and
(iv.2) drying the washed precursor of the zeolitic material having an MWW framework structure and comprising boron and titanium.

12. The process of claim 1, wherein in (v), the calcining is carried out at a temperature in the range of from 500 to 700° C.

13. The process of claim 1, wherein prior to (v), the precursor of the zeolitic material having an MWW framework structure and comprising boron and titanium, obtained from (iii), is not treated with an aqueous solution having a pH of at most 6, as determined by a pH-sensitive glass electrode, and wherein after (v), the calcined zeolitic material having an MWW framework structure and comprising boron and titanium is not treated with an aqueous solution having a pH of at most 6, as determined by a pH-sensitive glass electrode.

14. The process of claim 1, further comprising
(vi) shaping the zeolitic material having an MWW framework structure and comprising boron and titanium obtained from (v), thereby obtaining a molding; and
(vii) optionally drying and/or calcining the molding obtained from (vi).

15. A zeolitic material having an MWW framework structure and comprising boron and titanium, obtainable or obtained by the process according to claim 1.

16. The zeolitic material of claim 15, having an MWW templating agent content of at most 0.5 weight-% based on a total weight of the zeolitic material, wherein said MWW templating agent content is determined as a total organic carbon (TOC) content of the calcined zeolitic material.

17. The zeolitic material of claim 15, wherein a $^{29}$Si-NMR spectrum of the zeolitic material comprises a first signal in the range of from -95.0 to -105.0 ppm,
a second signal in the range of from -105.0 to -115.0 ppm, and
a third signal in the range of from -115.0 to -125.0 ppm.

18. The zeolitic material of claim 15, wherein a $^{11}$B-NMR spectrum of the zeolitic material comprises
a first signal in the range of from 20.0 to 10.0 ppm,
a second signal in the range of from 10.0 to 1.0 ppm,
a third signal in the range of from 1.0 to -7.0 ppm, and
a fourth signal in the range of from -7.0 to -16.0 ppm.

19. The zeolitic material of claim 15, having a water uptake in the range of from 12.0 to 16.0 weight-%.

20. A molding, comprising
the zeolitic material according to claim 15 and
optionally at least one binder.

21. A catalyst, comprising the zeolitic material according to claim 15.

22. A bifunctional catalyst, comprising the zeolitic material according to claim 15.

23. A zeolitic material having an MWW framework structure and comprising boron and titanium, optionally obtainable or obtained by the process according to claim 1, wherein at least 99 weight-% of the zeolitic framework structure consist of boron, titanium, silicon, oxygen, and hydrogen, and wherein a molar ratio of boron, relative to silicon, is in the range of from 0.05 : 1 to 0.15 : 1, and a molar ratio of titanium, relative to silicon, is in the range of from 0.017 : 1 to 0.025 : 1.

24. The zeolitic material of claim 23, which is in a calcined state.

* * * * *

UNITED STATES PATENT AND TRADEMARK OFFICE
CERTIFICATE OF CORRECTION

Page 1 of 1

PATENT NO. : 10,300,468 B2
APPLICATION NO. : 15/509527
DATED : May 28, 2019
INVENTOR(S) : Andrei-Nicolae Parvulescu et al.

It is certified that error appears in the above-identified patent and that said Letters Patent is hereby corrected as shown below:

In the Specification

In Column 17, Line 58:
Delete "treate" and insert -- treated --.

In the Claims

In Column 38, Line 62:
Claim 16, delete "weight-%based" and insert -- weight-% based --.

In Column 39, Line 23:
Claim 16, delete "weight-%of" and insert -- weight-% of --.

Signed and Sealed this
Fourteenth Day of April, 2020

Andrei Iancu
*Director of the United States Patent and Trademark Office*